(12) United States Patent
Sakimura et al.

(10) Patent No.: US 7,409,111 B2
(45) Date of Patent: Aug. 5, 2008

(54) IMAGE SYNTHESIZING SYSTEM FOR AUTOMATICALLY RETRIEVING AND SYNTHESIZING IMAGES TO BE SYNTHESIZED

(75) Inventors: Takeo Sakimura, Urayasu (JP); Katsumi Iijima, Hachioji (JP); Katsuhiko Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 11/201,616

(22) Filed: Aug. 10, 2005

(65) Prior Publication Data
US 2006/0038897 A1    Feb. 23, 2006

Related U.S. Application Data

(63) Continuation of application No. 09/174,227, filed on Oct. 16, 1998, now abandoned.

(30) Foreign Application Priority Data

Oct. 21, 1997 (JP) .................................. 9-305078
Sep. 21, 1998 (JP) ................................ 10-265894
Sep. 21, 1998 (JP) ................................ 10-265895

(51) Int. Cl.
*G06K 9/54* (2006.01)
*G06K 9/36* (2006.01)
*G06K 9/32* (2006.01)
*G06K 9/60* (2006.01)

(52) U.S. Cl. .................. 382/305; 382/284; 382/294

(58) Field of Classification Search ............... 382/305, 382/306, 154, 284, 312; 348/46, 47, 48, 348/36, 37, 38; 707/1, 2, 3; 358/1.16, 530, 358/540

See application file for complete search history.

(56) References Cited

U.S. PATENT DOCUMENTS

| | | |
|---|---|---|
| 5,572,726 A | 11/1996 | Hasuo |
| 5,706,457 A | 1/1998 | Dwyer et al. |
| 5,745,126 A | 4/1998 | Jain et al. |
| 5,963,664 A | 10/1999 | Kumar et al. |
| 6,335,742 B1 | 1/2002 | Takemoto |
| 6,389,179 B1 | 5/2002 | Katayama et al. |
| 6,507,358 B1 | 1/2003 | Mori et al. |
| 6,549,681 B1 | 4/2003 | Takiguchi et al. |

*Primary Examiner*—Yon Couso
(74) *Attorney, Agent, or Firm*—Morgan & Finnegan, LLP

(57) ABSTRACT

An image processing apparatus which associates a plurality of images obtained in advance for the purpose of panoramic image synthesis or stereo-scopic viewing display without troubling the user. Whether or not component images are to be associated with each other is determined with reference to the file names and attribute information of a plurality of component images to be synthesized without the intervention of the user.

52 Claims, 25 Drawing Sheets

FIG. 6

401 DIRECTORY ENTRY

| FILE NAME | EXTENSION | ATTRIBUTE INFORMATION | HEAD CLUSTER |
|---|---|---|---|
| IMAGE1_R | bmp | 1997.3.11 16:23:01,··· | 1H |
| IMAGE1_L | bmp | 1997.3.11 16:23:02,··· | 2H |
| IMAGE100 | bmp | 1997.8.21 15:00:00,··· | 3H |
| ⋮ | ⋮ | ⋮ | ⋮ |

| COMPONENT IMAGE | OTHER COMPONENT IMAGE IN SET |
|---|---|
| IMAGE1_L | IMAGE1_R |
| IMAGE1_R | IMAGE1_L |
| ⋮ | ⋮ |

FIG. 12

| FILE NAME | EXTENSION | ATTRIBUTE INFORMATION | HEAD CLUSTER |
|---|---|---|---|
| IMAGE_R | bmp | 1997.3.11 16:23:01,··· | 1H |
| IMAGE_L | bmp | 1997.3.11 16:23:02,··· | 2H |
| IMAGE2 | bmp | 1997.8.21 15:00:00,··· | 3H |
| ⋮ | ⋮ | ⋮ | ⋮ |

FIG. 13

| GRADATION CONVERSION |

| SMOOTHING |

| EDGE EMPHASIS |

| FILE NAME | IMAGE1.bmp | |
|---|---|---|
| HEADING | PANORAMIC IDENTIFIER | P1 |
| | IMAGE POSITION : | ROW1, COLUMN1 |
| FILE NAME | IMAGE2.bmp | |
| HEADING | PANORAMIC IDENTIFIER | P1 |
| | IMAGE POSITION : | ROW1, COLUMN2 |
| FILE NAME | IMAGE3.bmp | |
| HEADING | PANORAMIC IDENTIFIER | P1 |
| | IMAGE POSITION : | ROW2, COLUMN1 |
| FILE NAME | IMAGE4.bmp | |
| HEADING | PANORAMIC IDENTIFIER | P1 |
| | IMAGE POSITION : | ROW2, COLUMN2 |

12

IMAGE SYNTHESIZING SYSTEM FOR AUTOMATICALLY RETRIEVING AND SYNTHESIZING IMAGES TO BE SYNTHESIZED

RELATED APPLICATION DATA

This is a continuation of application Ser. No. 09/174,227, filed Oct. 16, 1998, now abandoned.

BACKGROUND OF THE INVENTION

The present invention relates to an image-picking up and displaying system having a panoramically imaging/displaying function and stereo-scopically imaging/displaying function, and the image-picking up and displaying system.

The present invention also relates to an edit system for an image file obtained by an imaging or image-picking up apparatus.

Conventionally, a method for processing (e.g., synthesizing) and displaying a series of a plurality of captured images is known. For example, an image-picking up/displaying method for displaying two systems of image signals picked up by a multiple image-picking up apparatus or by a single image-picking up apparatus via two picking-up processes is known. When the single image-picking up apparatus is used, picking-up is done by matching the view points of two image-picking up optical systems, and the two obtained images are synthesized at the boundary of the image-picking up ranges, thus presenting to the observer a high-precision panoramic image, which has a larger field, angle and suffers less distortion than the image picked up by the single image-picking up apparatus.

When picking-up is made from two view points by placing two image-picking up optical systems at right and left positions at a spacing nearly equal to the base length, since disparity is produced in the two obtained images, the observer can observe a stereo-scopic image by stereo-scopically observing these two images. As a stereo-scopic image display method, a method of displaying an image using a stereo-scopic display, a method of switching and displaying right and left images using liquid crystal shutter spectacles, and the like are known.

In the following description, assume that n-eye images include both n images obtained by an n-eye image-picking up apparatus via a single picking-up process, and n images obtained by a single image-picking up apparatus via n picking-up processes.

In either of panoramically image-picking up/displaying or stereo-scopically image-picking up/displaying, two systems of image signals picked up by a multiple image-picking up apparatus or obtained by a single image-picking up apparatus must be simultaneously processed. Upon recording these two images on a recording medium of an apparatus, the synthesized image may be recorded. However, in consideration of the need for observation of only component images of the synthesized image or capacity saving of the recording medium, and the like, only component images are conventionally recorded.

When only component images are recorded on the recording medium, and a panoramic or stereo-scopic image is reproduced from the images stored in the recording medium, a plurality of component images, i.e., a pair of component images that form the synthesized image, must be selected to reproduce the synthesized image.

In general, in order to read out a plurality of images picked up by an n-type image-picking up/displaying system or obtained by a single-eye image-picking up/displaying system via a plurality of picking-up processes from the recording medium, process (e.g., synthesize) these images, and display them at the same time, the user must select the plurality of images to be processed one by one.

However, in the aforementioned prior art, since a set of n images picked up at the same time are independent ones, it is troublesome for the user to select such set of n images one by one.

SUMMARY OF THE INVENTION

The present invention has been made in consideration of the conventional problems, and has its first object to provide an image-picking up/displaying system which, when the user selects one of a plurality of images to be reproduced, simultaneously selects the remaining image or images and can display a synthesized image immediately, and is easy for the user to use.

It is another object of the present invention to provide an image-picking up/displaying system which, when the user selects one of a plurality of images to be reproduced, simultaneously selects the remaining image or images and can display a synthesized image immediately, and is easy for the user to use.

It is still another object of the present invention to provide an image storage apparatus which can record image files that can be applied to the image-picking up/displaying system.

In order to achieve the above objects, an image storage apparatus according to the present invention, comprises:

image-picking up means for picking up a set of n images which are associated with each other; and recording means for recording in a memory each of the set of n images picked up by the image-picking up means together with inter-set identification information indicating that the image belongs to the set but does not belong to other sets, and intra-set identification information indicating an association with other images in the set.

According a preferred aspect of the present invention, the image-picking up means comprises an n-eye camera.

According a preferred aspect of the present invention, the image-picking up means comprises a single-eye camera, and obtains n images by picking up an object n times using the camera.

According a preferred aspect of the present invention, the inter-set identification information is a file name character assigned to the image, and has a character string common to other sets and a set number for specifying the set to which the image belongs. The file name character can be, e.g., a character string provided by an application program. In this way, images generated by the application program have identical file name portions, thus maintaining data consistency.

According a preferred aspect of the present invention, the intra-set identification information includes a character that represents a position of the image in a synthesized image. The position identifies a right- or left-eye image when the synthesis is made to generate a stereo-scopic image, or identifies the fitting position to a panoramic image when the synthesis is made to generate a panoramic image.

According a preferred aspect of the present invention, the inter-set identification information is a file name assigned to the image.

According a preferred aspect of the present invention, the intra-set identification information is a file name assigned to the image.

According a preferred aspect of the present invention, the inter-set identification information includes a creation date and time of the image.

According a preferred aspect of the present invention, the intra-set identification information includes a creation date and time of the image.

According a preferred aspect of the present invention, the inter-set identification information includes a character for identifying an objective of the image. The objective is, e.g., generation of a stereo-scopic or panoramic image.

According a preferred aspect of the present invention, the intra-set identification information includes a character for identifying an objective of the image.

According a preferred aspect of the present invention, the intra-set identification information and inter-set identification information are appended to a heading field of an image file.

According a preferred aspect of the present invention, the intra-set identification information and inter-set identification information are appended to a heading file independently of the image.

The above objects is also achieved by an image file apparatus according to the present invention. The file apparatus comprises:

recording means for recording each of a set of n images, which are associated with each other, together with inter-set identification information which indicates that the image belong to that set but does not belong to other sets, and intra-set identification information which indicates an association with other images in that set;

designation means for designating an arbitrary first image recorded in the recording means;

means for identifying a first set to which the first image belongs on the basis of the inter-set identification information of the designated first image, and specifying another image which belongs to the first set on the basis of the intra-set identification information of the first image; and synthesizing means for synthesizing the first image and the other image on the basis of the intra-set identification information.

According a preferred aspect of the present invention, the synthesizing means comprises means for visibly reproducing the synthesized image.

Images which belong to an identical set may be present. In such case, according to a preferred aspect of the present invention, the specifying means comprises:

means for searching for a second image having the same inter-set identification information value as the inter-set identification information of the first image designated by the designation means; and means for determining whether or not the second image has intra-set identification information of a predetermined format.

Since the inter-set identification information and intra-set identification information are arbitrary for the user, they may not be set in an image file or may be deleted. In such case, according to a preferred aspect of the present invention, images recorded in the recording means are appended attribute information each indicating an attribute of the image in addition to the inter-set identification information and intra-set identification information, and the specifying means further comprises:

means for checking if the second image is present in the recording means; and means for searching the recording means for a third image having an attribute information value approximate to the attribute information value of the first image, when it is determined that the second image is not present.

According a preferred aspect of the present invention, the specifying means further comprises:

means for determining that the third image belongs to a set different from the set to which the first image belongs, and inhibiting the third image from being employed as an image to be synthesized, when a difference between the attribute in-formation values of the first and third images exceeds a predetermined threshold value.

According a preferred aspect of the present invention, the specifying means comprises means for displaying the first image and the other image specified by the specifying means for user's confirmation, when the other image which belongs to the first set is specified. A user interface that matches the user's favor can be realized.

According a preferred aspect of the present invention, the synthesizing means synthesizes the first image and the specified other image for a panoramic synthesis objective.

According a preferred aspect of the present invention, the synthesizing means synthesizes the first image and the specified other image for a stereo-scoping viewing objective.

The above objects are also achieved by an image recording method and image file management method described in the appended claims.

Processing to be executed for arbitrary one of a set of images to be processed together, which are associated with each other, is preferably automatically executed for the remaining images so as to coordinate all the images in the set.

It is, therefore, still another object of the present invention to provide an image processing apparatus and method which automatically execute processing to be executed for a set of images to be processed together for the remaining images.

According to the present invention directed to this object, an image processing apparatus for processing data of a plurality of images which are linked to each other for predetermined processing via predetermined attribute information, comprises:

selection means for allowing a user to select an arbitrary first image of the plurality of images as an object to be subjected to the predetermined processing;

search means for searching for a second image, which is linked to the first image, on the basis of the attribute information of the first image selected by the selection means; and processing means for performing the predetermined processing for the first and second images.

According to a preferred aspect of the present invention, the apparatus further comprises recording means for recording an image subjected to the predetermined processing by the processing means in a recording medium. This apparatus pursues high efficiency.

According to a preferred aspect of the present invention, the apparatus further comprises updating means for updating the attribute information of the image subjected to the predetermined processing by the processing means to indicate that the predetermined processing has been done. This apparatus pursues consistency after updating.

According a preferred aspect of the present invention, the predetermined processing is color correction.

According a preferred aspect of the present invention, the predetermined processing is gradation correction.

According a preferred aspect of the present invention, the predetermined processing is color conversion.

According a preferred aspect of the present invention, the predetermined processing is gradation conversion.

According a preferred aspect of the present invention, the predetermined processing is image enlargement.

According a preferred aspect of the present invention, the predetermined processing is file format conversion.

According to a preferred aspect of the present invention, the predetermined processing is image transfer.

According to a preferred aspect of the present invention, the predetermined processing is image rotation, and the updating means updates the attribute information to indicate rotated positions of the plurality of images in a synthesized image. Rotation of the synthesized image not only rotates individual images but also moves their positions.

According to a preferred aspect of the present invention, the predetermined processing is image reversal, and the updating means updates the attribute information of each reversed image to indicate the rotated position in a synthesized image.

The above object is also achieved by an image processing apparatus for forming a synthesized image by processing a plurality of images which are linked to each other via predetermined attribute information. The image processing apparatus comprises:

selection means for selecting an arbitrary first image from the plurality of images;

cutout range designation means for designating a cutout range in the synthesized image;

detection means for detecting images that include the designated cutout range with reference to the attribute information of the plurality of images; and synthesizing means for cutting out image portions from the images detected by the detection means, and synthesizing the image portions.

The above object is also achieved by an image processing method for processing data of a plurality of images which are linked to each other for predetermined processing via predetermined attribute information. The image processing method comprises the steps of:

selecting an arbitrary first image of the plurality of images as an object to be subjected to the predetermined processing;

searching for a second image, which is linked to the first image, on the basis of the attribute information of the first image selected in the selection step; and performing the predetermined processing for the first and second images.

The above object is also achieved by an image processing method for forming a synthesized image by processing a plurality of images which are linked to each other via predetermined attribute information. The image processing method comprises the steps of:

selecting one arbitrary image from the plurality of images;

designating a cutout range;

detecting images that include the designated cutout range with reference to the attribute information of the plurality of images; and cutting out image portions from the images detected in the detection step, and synthesizing the image portions.

The present invention is also directed to the following objective. For example, when a set of created images are deleted from a storage medium, the user must repeat deletion in correspondence with the number of images to be deleted. On the other hand, when one component image that forms a stereo-scopic image is deleted, the attribute of the other component image must be changed to that which disables stereoscopic viewing. More specifically, when a set of images are processed together, and one arbitrary image in the set is to be, e.g., deleted, the user must appropriately process the remaining images by himself or herself. However, such operations are cumbersome.

It is, therefore, still another object of the present invention to provide an image processing apparatus and method which does not require such cumbersome operations.

It is still another object of the present invention to provide an image processing apparatus and method, which can automatically delete the remaining images when one arbitrary image of a set of images to be processed together is deleted.

In order to achieve the above objects, according to the present invention, an image processing apparatus for processing a plurality of images which are linked to each other for predetermined processing via predetermined attribute information, comprises:

image exclusion means for excluding a first image of the plurality of images from an object of the predetermined processing; and information deletion means for deleting information indicating an association with the first image in terms of the predetermined processing from attribute information of a second image other than the first image of the plurality of images.

According to a preferred aspect of the present invention, the processing for excluding the first image from the object of the predetermined processing is processing for deleting an image file from a memory.

According to a preferred aspect of the present invention, the information deletion means sets, in the attribute information of the second image, information indicating that the first image is excluded from the object of the predetermined processing, and the second image remains as the object of the predetermined processing.

In order to achieve the above objects, according to the present invention, an image processing apparatus for processing a plurality of images which are linked to each other for predetermined processing via predetermined attribute information, comprises:

means for, when a first image of the plurality of images is deleted from the object of the predetermined processing, deleting remaining images other than the first image of the plurality of images.

In order to achieve the above objects, according to the present invention, an image processing apparatus for processing a plurality of images which are linked to each other for predetermined processing via predetermined attribute information, comprises:

first user interface means for instructing to delete a first image of the plurality of images from an object of the predetermined processing;

second user interface means for instructing as to whether or not remaining images other than the first images are to be deleted upon reception of the instruction; and means for deleting information indicating the first image from attribute information of each of the remaining images upon reception of an instruction indicating that the remaining images other than the first image are not to be deleted.

In order to achieve the above objects, according to the present invention, an image file management method comprises the steps of:

excluding a first image of a plurality of images, which are linked to each other for predetermined processing via predetermined attribute information, from an object of predetermined processing; and deleting information indicating the first image from attribute information of each of remaining images.

According to a preferred aspect of the present invention, the processing for excluding the first image from the object of the predetermined processing is deletion processing.

According to a preferred aspect of the present invention, information indicating that only the remaining images are used as objects of the predetermined processing is set in attribute information of each of the remaining images.

According to a preferred aspect of the present invention, the attribute information is included in a file name of an image.

The above objects can be similarly achieved by an image processing method and the like, which are directed to apparatuses such as the aforementioned image processing apparatuses.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a table showing a directory entry in the storage apparatus in the image-picking up/displaying system according to the first embodiment of the present invention;

FIG. 7 shows the format upon storing the inter-set identification information, intra-set identification information, attribute information, and the like in a file;

FIG. 12 is a table showing an example of a directory entry of the example of files shown in FIG. 11;

FIG. 13 shows a screen menu that presents the types of image processing prepared for the third embodiment;

DETAILED DESCRIPTION OF THE INVENTION

The preferred embodiments of the present invention will be described hereinafter with reference to the accompanying drawings.

FIRST EMBODIMENT

The first embodiment of the present invention will be described below with reference to FIGS. 1 to 4.

An image-picking up/displaying system of this embodiment obtains a plurality of (two) images picked up by a multiple image-picking up apparatus, and records these images in a storage apparatus by appending predetermined information thereto, thus associating these images as component images of a panoramic or stereo-scopic image. Upon reproduction, when one of two component images to be synthesized is selected, the other image corresponding to the selected image is also selected on the basis of the information appended upon recording, and these images are automatically synthesized to reproduce a panoramically synthesized image. This method will be explained below.

Note that the contents of this embodiment can be similarly applied not only to an n-eye image-picking up/displaying system but also to an image-picking up/displaying system which has a single-eye image-picking up apparatus and obtains a plurality of images via a plurality of picking-up processes.

Figure 1:
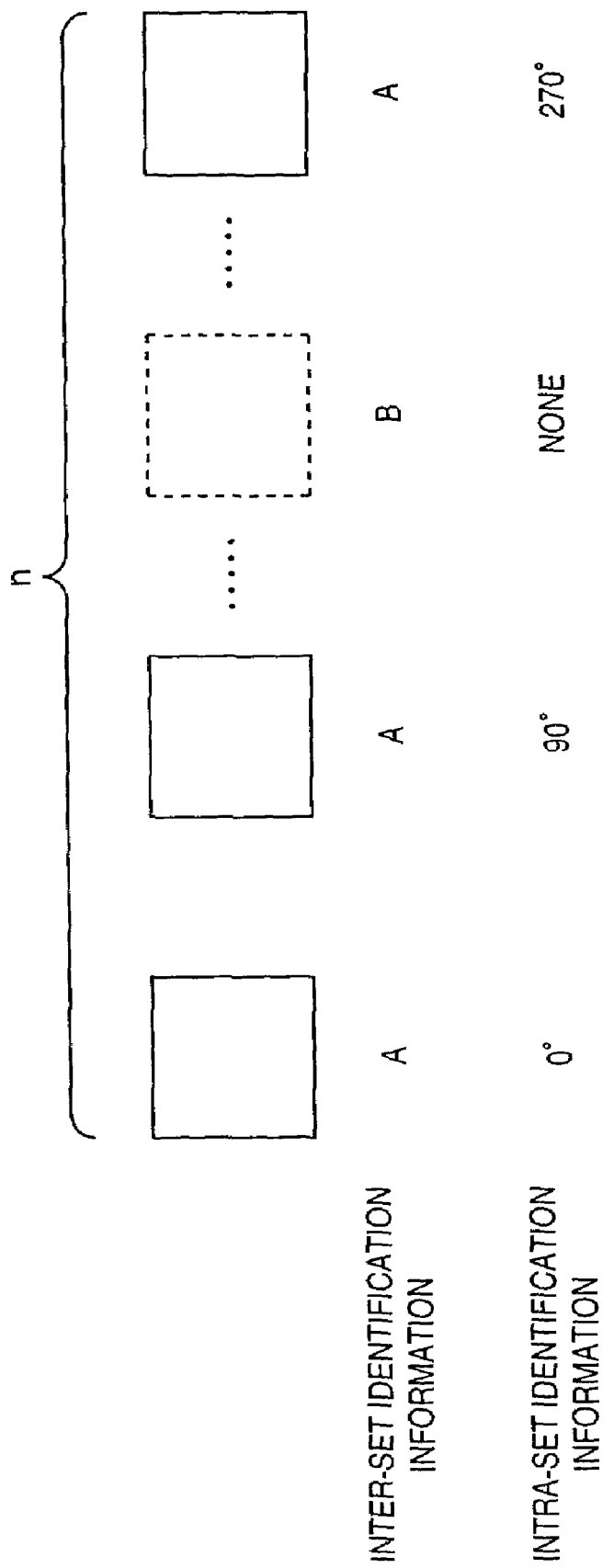
FIG. 1 is a view for explaining inter-set identification information and intra-set identification information according to the first embodiment of the present invention.

FIG. 1 is a view for explaining the principle of the recording format upon image recording in the image-picking up/displaying system of the first embodiment.

As described above, the present invention can be applied to either an n- or single-eye image-picking up system. FIG. 1 shows a case wherein n component images are obtained by such image-picking up system. These n component images are used for synthesizing a panoramic image or for displaying a stereo-scopic image.

These n component images form one set that configure a single panoramic or stereo-scopic image. For this reason, when n component images are recorded in a magnetic disk file apparatus or optical disk apparatus, an "inter-set identifier" for identifying the set of images from other sets, and an "intra-set identifier" for identifying each component image in the set from other component images in the set are recorded together with these image data.

Since the inter-set identifier is used for identifying a given set of component images from other sets of component images, it can be the one like the title of a normal image file. In the example shown in FIG. 1, identifier "A" of an identical title is appended to n component images.

The intra-set identifier identifies a component image in a given set from other component images in that set, and preferably describes the way each component image is used. For example, when four component images are obtained at 90° angular intervals to obtain a 360° panoramic image, the intra-set identifiers below are appended to the component images, so that not only each component image can be identified from other component images, but also the position of that component image in a panoramically synthesized image can be identified:

0 degree 90 degree 180 degree 270 degree

When a stereo-scopic image is to be displayed, it is appropriate to append the intra-set identifiers below like in the embodiment to be described later:

-L

-R

Figure 2:
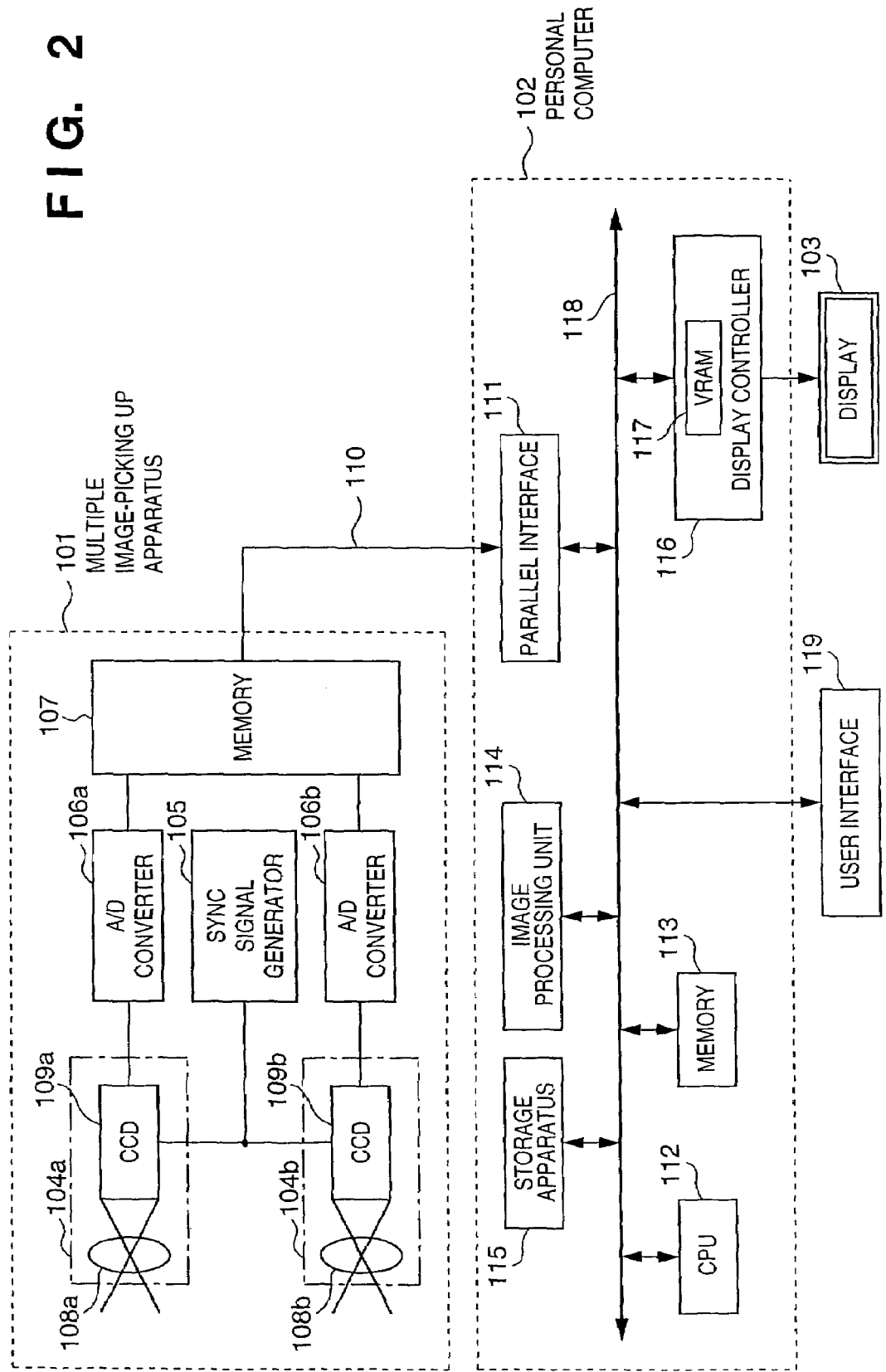
FIG. 2 is a block diagram showing the arrangement of an image-picking up/displaying system according to the first embodiment.

FIG. 2 is a block diagram showing the arrangement of an image-picking up/displaying system according to the first embodiment.

The image-picking up/displaying system shown in FIG. 2 comprises as principal building components a multiple image-picking up apparatus (2-eye image-picking up apparatus) 101, personal computer (PC) 102, and display 103.

The multiple image-picking up apparatus 101 has two, left and right image-picking up optical systems 104a and 104b, sync signal generator 105, A (analog)/D (digital) converters 106a and 106b, and memory 107. The image-picking up optical systems 104a and 104b respectively comprises lenses 108a and 108b, and CCDs 109a and 109b serving as image-picking up elements. The sync signal generator 105 is connected to the two image-picking up optical systems 104a and 104b. The memory 107 is connected to the A/D converters 106a and 106b. The multiple image-picking up apparatus 101 is connected to the personal computer 102 via an interface cable 110.

The personal computer 102 (in this embodiment, a PC-AT compatible personal computer) has as its building elements a parallel interface 111, CPU (central processing unit) 112, memory 113, image processor 114, storage apparatus 115 such as a magnetic disk, optical disk, or the like, display controller 116, and VRAM (video random-access memory) 117. These building components are connected to a CPU bus 118. The parallel interface 111 (e.g., a SCSI interface or the like) is connected to the memory 107 of the multiple image-picking up apparatus 101, and the display controller 116 is connected to the display 103. Image signals are input from the multiple image-picking up apparatus 101 via the parallel interface 111, and are output to the display 103 via the display controller 116.

A predetermined user interface 119 (e.g., a keyboard, mouse, or the like) is connected to the CPU bus 118 of the personal computer 102.

The operation of the image-picking up/displaying system with the aforementioned arrangement will be explained below.

Two, left and right images formed by the lenses 108a and 108b in the two image-picking up optical systems 104a and 104b in the multiple image-picking up apparatus 101 are picked up by the corresponding CCDs 109a and 109b. The two, left and right images are picked up by synchronizing the right and left image-picking up optical systems 104a and 104b on the basis of a sync signal generated by the sync signal generator 105. Electrical signals of the obtained images are converted into digital signals by the A/D converters 106a and 106b, and the digital signals are stored in the memory 107.

These two systems of image signals are input to the parallel interface 111 in the personal computer 102 via the interface cable 110.

The images input to the parallel interface 111 are transferred to the memory 113 in the personal computer 102 via the CPU bus 118. Note that image processing in the personal computer 102 is done on an area of the memory 113. The image processing unit 114 performs image processing such as disparity correction and the like for these image data. After that, the display controller 116 transfers the right and left image data to the VRAM 117, and displays them on the display 103. The user interface 119 is used for performing processing of the apparatus of this embodiment.

Figure 3:
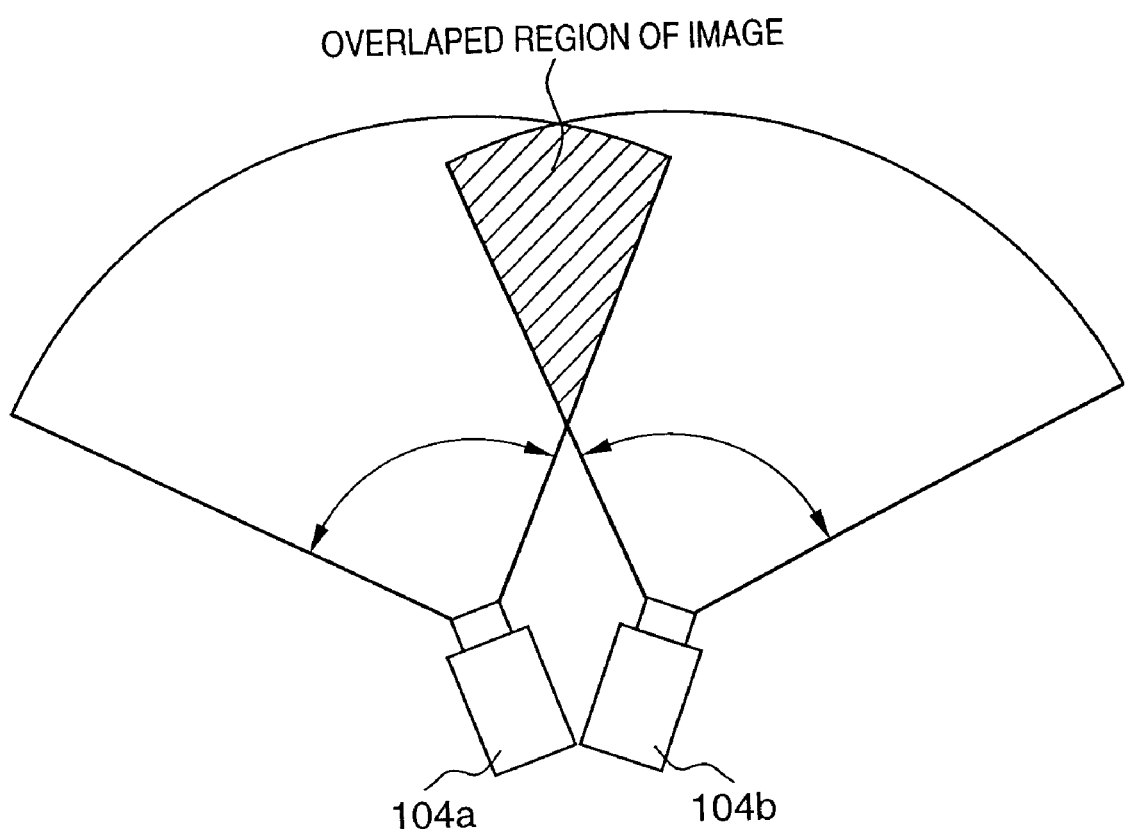
FIG. 3 is a view for explaining camera setups upon panoramic image-picking up.

In order to obtain a panoramically synthesized image, the view points of the two image-picking up optical systems 104a and 104b are matched with each other, as shown in FIG. 3. The two image-picking up optical systems 104a and 104b are placed to form an overlapping region in a direction in which the images to be picked up neighbor. The two images obtained from the optical systems 104a and 104b are captured on the memory 113 in the personal computer 102, and are then recorded in the storage apparatus 115. Upon synthesis, a correspondence between the overlapping regions of the right and left images on the memory 113 is determined by, e.g., template matching directly or after they are read out from the storage apparatus 115, and the two images are synthesized so as to match the overlapping regions. In this way, the user can observe a high-precision panoramic image which has a larger field angle and suffers less distortion than the image picked up by a single-eye apparatus.

The operation of the image-picking up/displaying system of the first embodiment has been described.

This operation is similarly made when a pair of right and left images are temporarily recorded in the storage apparatus 115 under the control of the CPU 112, and a synthesized image to be displayed on the display 103 is reproduced using the images read out from the storage apparatus 115.

In the first embodiment, the two picked-up images are recorded not as a synthesized image but as independent images. If a synthesized image is recorded, only one panoramically synthesized image need only be selected upon reproduction. However, in order to record one panoramically synthesized image in addition to two component images, a very large recording capacity is required. Also, when the user actually observes an image, he or she may often want to observe not only the synthesized image but also individual component images that form the synthesized image. For this reason, it is inconvenient to record only the synthesized panoramic image and to delete the individual component images. Hence, upon reproduction, the images are synthesized again to display the synthesized image on the display 103, and two component images which are not synthesized are directly recorded in the storage apparatus 115. However, when two, right and left component images that form a single panoramic image are to be reproduced, the user must select the right and left images, resulting in poor operability for synthesized image reproduction.

To solve such problem, when the user selects one of two, right and left component images that form a synthesized image, the apparatus of the first embodiment selects the other component image without any intervention of the user, and displays an image obtained by synthesizing these two component images on the display 103.

This method will be explained below with reference to FIGS. 4 to 6. The method of this embodiment is executed using software (control program) loaded from a medium (not shown) onto a program memory of the personal computer 102. This software runs under the control of the CPU 112.

Figure 4:
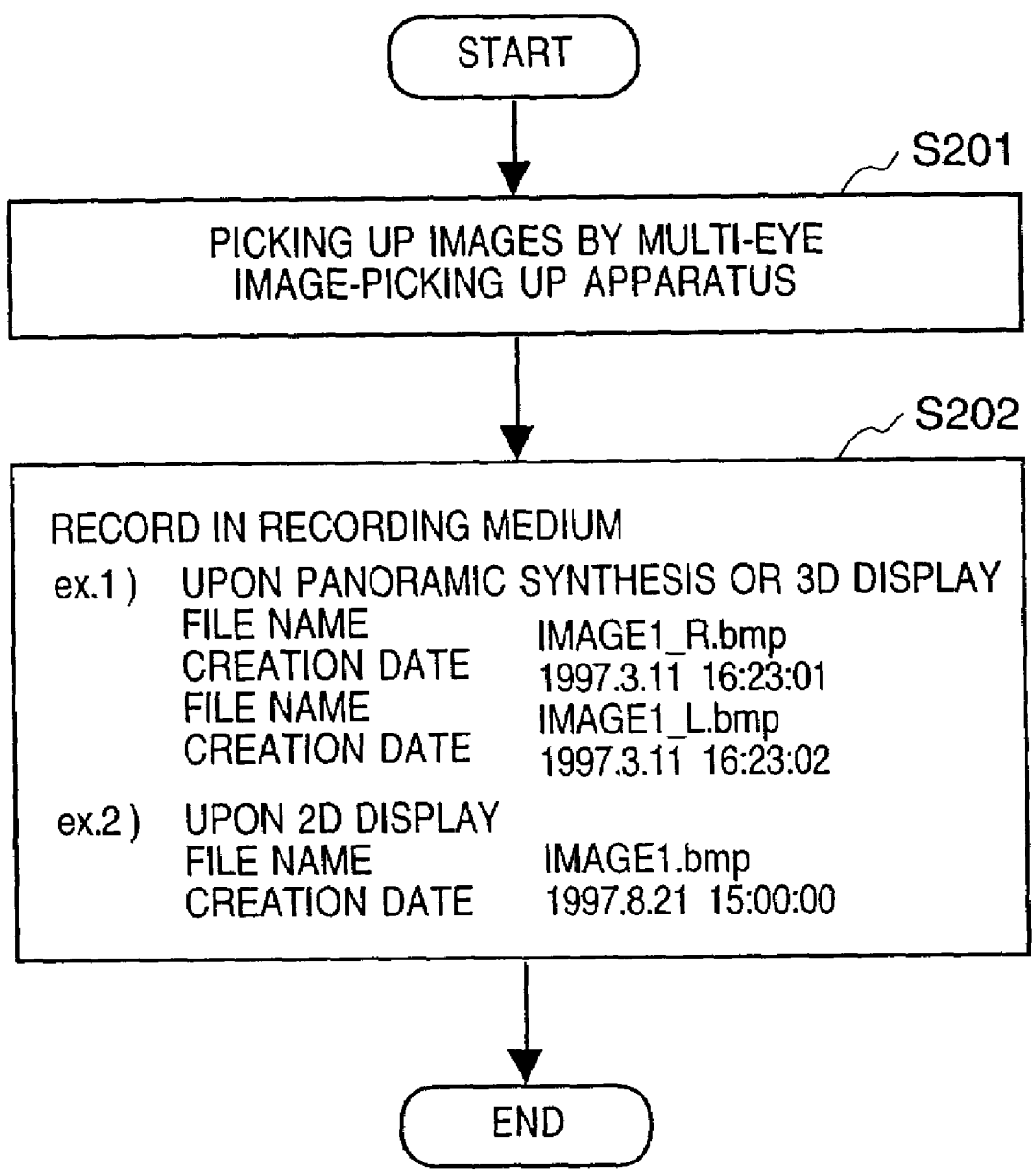
FIG. 4 is a flow chart showing the recording control sequence of multiple images in a storage apparatus in the image-picking up/displaying system according to the first embodiment of the present invention.
Figure 5:
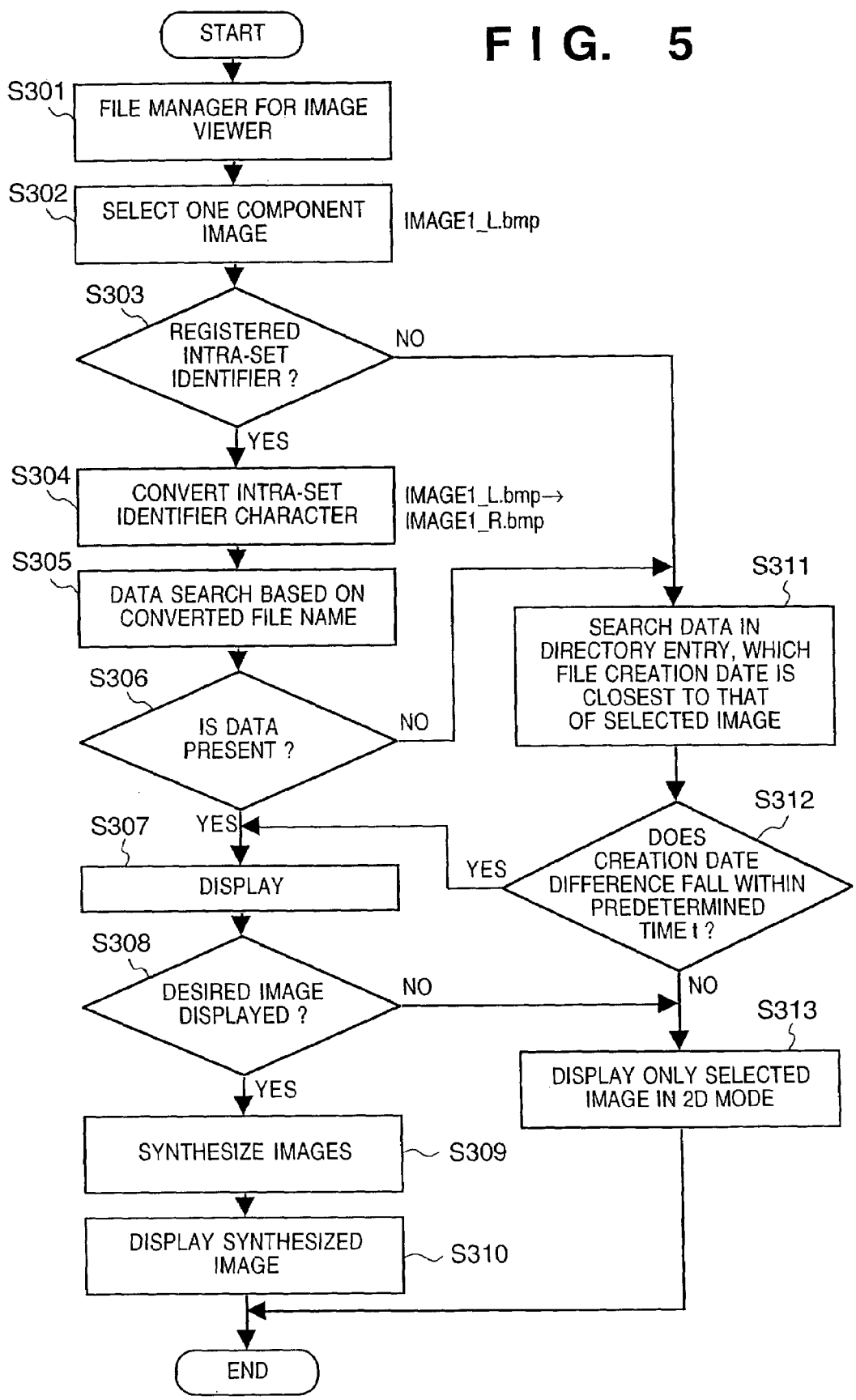
FIG. 5 is a flow chart showing the image reproduction control sequence in the image-picking up/displaying system according to the first embodiment of the present invention.

FIG. 4 is a flow chart showing the multiple image recording control sequence into the storage apparatus 115 in the image-picking up/displaying system according to this embodiment, and FIG. 5 is a flow chart showing the control sequence until reproduction and display of a set of component images from the storage apparatus 115 in the image-picking up/displaying system according to this embodiment.

Referring to FIG. 4, two, left and right systems of images are picked up by the two image-picking up optical systems 104a and 104b of the multiple image-picking up apparatus 101 in step S201. Assume that the two image-picking up optical systems 104a and 104b are placed for picking up images to be used for panoramic display (see FIG. 3). In the next step S202, file names obtained by appending identification characters for identifying the right and left images to a common character string are assigned to these images, and the images are recorded in the storage apparatus 115, thus ending this processing.

In this case, the common character string is, e.g., "IMAGE1". As the identification characters, for example, "-R" is appended to the right image, and "-L" to the left image. Hence, the titles of the two, right and left images are respectively:

IMAGE1-R
IMAGE1-L

When these images are saved in the bitmap format, an extension "bmp" representing the bitmap format is further appended to these titles, and the right and left image are respectively named:

IMAGE1-R.bmp
IMAGE1-L.bmp

Note that the file format upon recording is not limited to the bitmap format, and the same applies to a case wherein the images are recorded in various other file formats. For example, if the personal computer 102 is an Apple Macintosh series computer, the file format is indicated by PICT. Also, for example, the .pdf format may be used.

When steps S201 and S202 repeat themselves to pick up more images by the image-picking up optical systems 104a and 104b, common character strings of the file names of newly obtained component images are named like "IMAGE2", "IMAGE3", . . . . Hence, the new component images are:

IMAGE2-R.bmp
IMAGE2-L.bmp
IMAGE3-R.bmp
IMAGE3-L.bmp

Three sets of (a total of six) component images IMAGE1, IMAGE2, and IMAGE3 are identified from component images of other sets by their titles. Furthermore, in each set, component images are identified from each other by intra-set identifiers "R" and "L".

In EX-2 in step S202, a single, independent 2D image, which is neither for panoramic display nor stereo-scopic image display, is recorded.

In the system of the first embodiment, "attribute information" is also appended to data to be recorded in addition to the above-mentioned "inter-set identifier" and "intra-set identifier". This information is appended onto a directory entry of an OS (operating system) of the storage apparatus 115 by the OS (e.g., MSDOS or WINDOWS).

FIG. 6 shows the architecture of the directory entry in the storage apparatus 115.

In FIG. 6, reference numeral 401 denotes a directory entry, which describes a file name 402, extension 403, attribute information 404, head cluster 405, and the like of each file recorded in the storage apparatus 115. As is known to those who are skilled in the art, a file tile (name) and extension are determined and input by the user's direct input via an application program. On the other hand, the creation date of each image file as attribute information is written in the directory by the OS. Also, the user can assign the "inter-set identifier" and "intra-set identifier" in each file name by the application program.

The application program of the system shown in FIG. 2 gives as a title of a component image file:

IMAGE+creation order number

In the example shown in FIG. 6, the creation dates of IMAGE1and IMAGE100 have a difference of around five months, and IMAGE1-R and IMAGE1-L, which are nearly simultaneously picked up have a time difference of around 1 sec.

In FIG. 6, the "head cluster" 405 indicates the head cluster in a FAT (file allocation table) of each file in hexadecimal notation.

Reproduction of these images will be described below with reference to FIG. 5.

In the image-picking up/displaying system according to this embodiment, a viewer program for displaying picked-up images is stored in an external memory (not shown), and is loaded on the memory 113 upon execution. That is, FIG. 5 explains some steps in the control sequence of the viewer program.

In FIG. 5, when an image is to be reproduced, a file manager of the viewer program is started in step S301 to allow the user to select one component image. This selection can be attained by displaying the file titles of all the component images in the storage apparatus 115 on the display 103 and making the user select one of these file titles via the user interface 119 (e.g., by inputting a file title at the keyboard), or by mapping thumbnail images of the respective component images in the VRAM 117, and presenting them as icons to the user.

In step S302, the user selects, e.g., "IMAGE1-L.bmp" as one image of the previously recorded component images "IMAGE1-R.bmp" and "IMAGE1-L.bmp" of a panoramic display image. Note that the image to be selected is not limited to "IMAGE1-L.bmp" as the left image, and the right image "IMAGE1-R.bmp" may be selected.

In step S303, it is checked if the identifier (intra-set identifier) appended to the title of the image selected by the user is the one (e.g., -L or -R) that has been registered as an intra-set identifier in advance in the system (or application program). In this example, since the two, right and left images are component images of a stereo-scopic image, the registered "intra-set identifier" is "-L" or "-R". If the image selected in step S302 has either identifier "-L" or "-R", YES is determined instep S303, and the flow advances to step S304. On the other hand, if the image has neither "-L" nor "-R", NO is determined in step S303, and the flow advances to step S311.

In step S304, the character of the intra-set identifier is converted. More specifically, "IMAGE1-L.bmp" is converted into "IMAGE1-R.bmp" to generate the file name of a new image to be selected.

In step S305, the memory 113 or storage apparatus 115 is searched to find image data with the converted file name "IMAGE1-R.bmp". It is then checked in step S306 if such data is stored in the memory 113 or storage apparatus 115. If YES in step S306, "IMAGE1-R.bmp" and "IMAGE1-

L.bmp" are simultaneously displayed on the display 103 in step S307, and the control requests the user in step S308 to determine if these images are his or her choices. If the user determines via the user interface 119 that these images are his or her choices, the set of two component images "IMAGE1-R.bmp" and "IMAGE1-L.bmp" are panoramically synthesized in step S309, and a single synthesized image is displayed on the display 103 in step S310. After the display, this processing ends.

Upon panoramically synthesizing the images, corresponding points of overlapping portions at the boundary of picked-up regions of the two component images "IMAGE1-R.bmp" and "IMAGE1-L.bmp" are determined by, e.g., template matching, and the two images are synthesized at the determined portions.

On the other hand, if the user determines in step S307 that the two displayed images are not his or her choices, in step S313 it is determined that an appropriate set of right and left images were not selected, and only the image initially selected by the user in step S302 is displayed in a 2D mode on the display 103, thus ending this processing.

Normally, the file names of the two, right and left images to be panoramically synthesized do not always have intra-set identifiers "-R" and "-L". For this reason, the file name to be selected cannot often be appropriately determined in step S303. The processing in steps S311 and S312 can cope with a case wherein image files are recorded without any appropriate intra-set identifiers.

More specifically, since a set of two, right and left image data for a panoramically synthesized image are picked up at a very short time interval, the creation dates of these image data described in the attribute information (see 404 in FIG. 6) of the directory entry in the storage apparatus 105 have a very short time difference. For this reason, if it is determined in step S303 that the file name of the right or left image does not have any registered intra-set identifier ("-R" or "L"), the creation dates in the directory entry of all the files in the storage apparatus 115 are checked in step S311 to select a file having a creation date closest to that of the image selected in step S302.

In general, when N images are picked up using an n-eye image-picking up apparatus for the purpose of displaying a panoramic or stereo-scopic image, the creation date difference of these images must be very small. Hence, a predetermined time t is used as the time required between the first and second depressions of the shutter to pick up images, and it is checked in step S312 if the difference between the creation date of the image selected in step S302 and that of an image found in step S311 is equal to or smaller than the predetermined time t. If YES in step S312, the two images are selected as component images that form a synthesized image, and a panoramically synthesized image is displayed on the display 103 (steps S307 to S309).

Also, if it is determined in step S306 that an image file having the title determined by applying the corresponding intra-set identifier is not present in the storage apparatus 115, the flow advances to step S311 to make a search based on the creation date of the file.

If it is determined in step S312 that the creation date difference is not equal to or smaller than the predetermined time t, since these images are not the ones to be synthesized, the flow advances to step S313, and only the image initially selected in step S302 is displayed in the 2D mode on the display 103 without synthesizing the two images.

On the other hand, if a single, independent two-dimensional image, which is not a component image, is selected, for example, if "IMAGE1.bmp" picked up and recorded by a single-eye apparatus (FIG. 4) is selected, since this "IMAGE1.bmp" has no right or left identifier (i.e., intra-set identifier), and the creation time of the file has a large time difference from those of other image files, the single, independent two-dimensional image alone is consequently displayed in the 2D mode on the display 103.

In this embodiment, the predetermined time t is set as the time required between the first and second depressions of the shutter to pick up images, but the present invention is not limited to this. The predetermined time t may be set arbitrarily. Since the creation date used as the attribute information of this image can be changed by the OS (operating system), if the same creation date is recorded for two picked-up images, two images can be simultaneously reproduced by selecting image files with the same creation date upon reproduction.

Advantages of First Embodiment

As described above, by appending intra-set identifier characters "-R" and "-L" indicating component images that form a panoramically synthesized image to image data to be recorded like "IMAGE1-R.bmp" and "IMAGE1-L.bmp", the user need only select one component image (e.g., "IMAGE1-R.bmp" or "IMAGE1-L.bmp") upon reproduction, and the apparatus simultaneously selects the other component image. Hence, two, right and left images can be automatically synthesized and the synthesized image can be displayed without troubling the user.

Even when an identification character which is not supported by the processing of this embodiment is used in a file name, two, right and left images can be selected by searching using the file creation dates in the directory entry, and the synthesized image can be displayed.

In this embodiment, a reproduction example of a panoramic display image has been exemplified. Also, reproduction of a stereo-scopic display image can be explained with reference to the flow charts shown in FIGS. 4 and 5. In this case, however, the two images are processed and displayed for stereo-scopic viewing. In order to display a stereo-scopic image, a method of displaying images on a stereo-scopic display, or a method of switching and displaying right and left images using liquid crystal shutter spectacles may be used. In the former method of displaying images on the stereo-scopic display, two, right and left images must be synthesized by alternately selecting them in units of lines of a frame. In the latter method using the liquid crystal spectacles, processing for switching and displaying right and left images on a single screen is required.

In this embodiment, the image-picking up/displaying system is built by the multiple image-picking up apparatus 101, personal computer 102, and separate type display 103. Alternatively, the present invention can be similarly applied to an integrated image-picking up/displaying system which incorporates these building elements.

Furthermore, the storage apparatus 115 of the image-picking up/displaying system is an internal one of the personal computer 102. However, the present invention is not limited to such specific apparatus, and a detachable storage apparatus such as a flash memory may be used.

SECOND EMBODIMENT

The second embodiment of the present invention will be described below with reference to FIGS. 7 to 9.

In the first embodiment, component images are identified based on "inter-set identifiers" and "intra-set identifiers"

appended to file titles. That is, these identifiers are included in a file title. In the second embodiment, inter-set identification and intra-set identification are realized by an independently created "heading file".

FIG. 7 shows the format of a heading file. That is, the heading file is created independently of an image file, and if a set of image files include N component images, the heading file records, for arbitrary one component image, identifiers of other component images in the set as data.

Note that information representing the relationship among component images in the set (to be referred to as set composition information hereinafter) need not always be present as an independent file, but may be appended to each component image as "heading information". In the control sequences shown in FIGS. 8 and 9, set composition information is appended as "heading information" in the heading field of each component image.

Note that the basic arrangement of an image-picking up/displaying system according to the second embodiment is the same as that shown in FIG. 2 in the aforementioned first embodiment, and the following explanation will be given using FIG. 2.

In the second embodiment, when one of two component images to be synthesized as a panoramic image, which are picked up by the multiple image-picking up apparatus 101 and are recorded in the storage apparatus 115, is selected, the other image is selected on the basis of file information of the other image appended to the header field of the file upon recording, and the creation date of the file in the directory entry, and the two images are automatically synthesized to reproduce a panoramically synthesized image. This method will be explained below.

Note that the contents of this embodiment allow an image-picking up/displaying system having three or more image-picking up optical systems to achieve the prescribed object by the same method. Hence, a multi-eye system will be exemplified below. The same applies to a case using a plurality of images obtained by a single-eye image-picking up/displaying system via a plurality of picking-up processes, in place of an n-eye image-picking up/displaying system.

Figure 8:
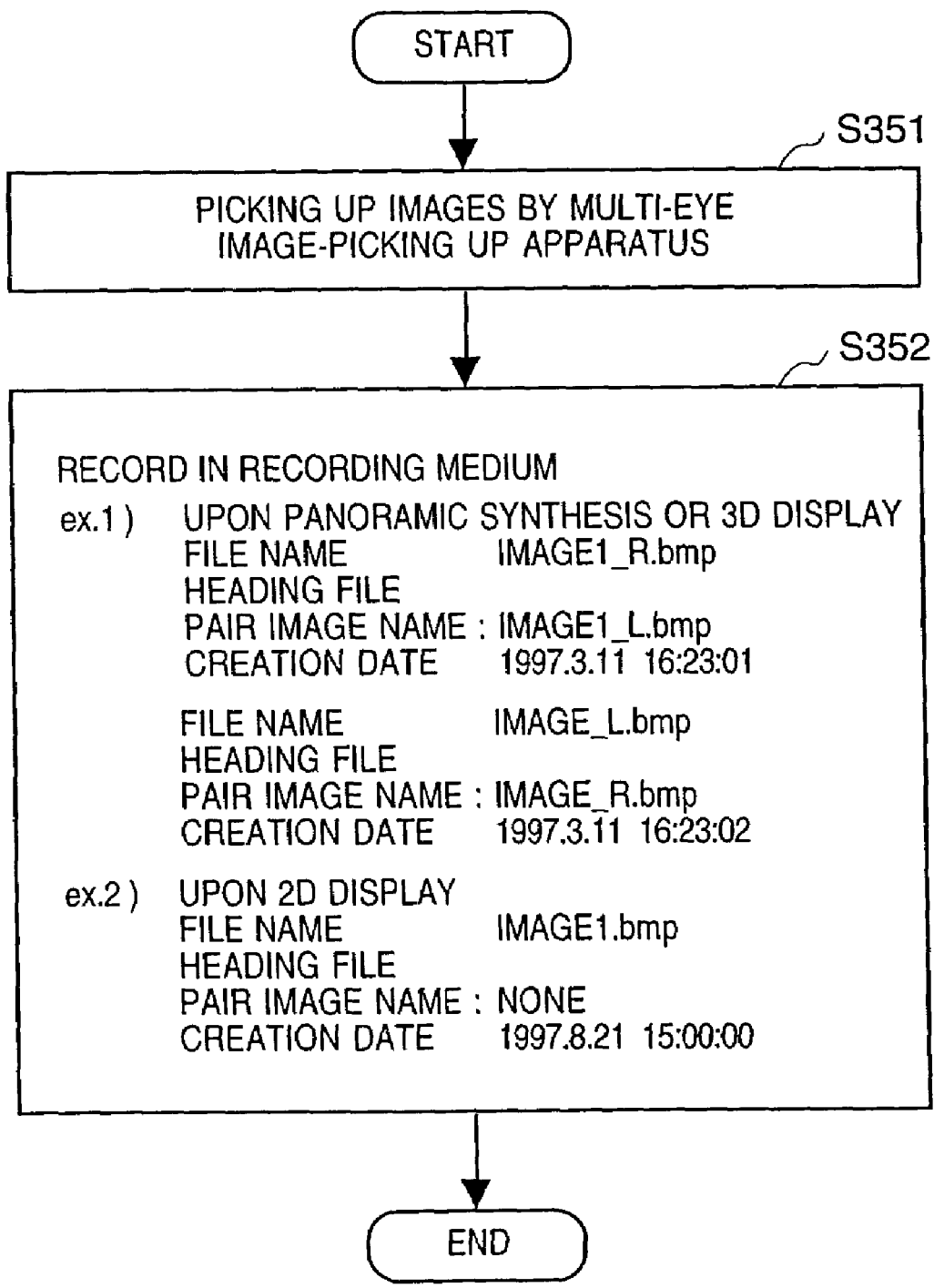
FIG. 8 is a flow chart showing the recording control sequence of multiple images in a storage apparatus in an image-picking up/displaying system according to the second embodiment of the present invention.
Figure 9:
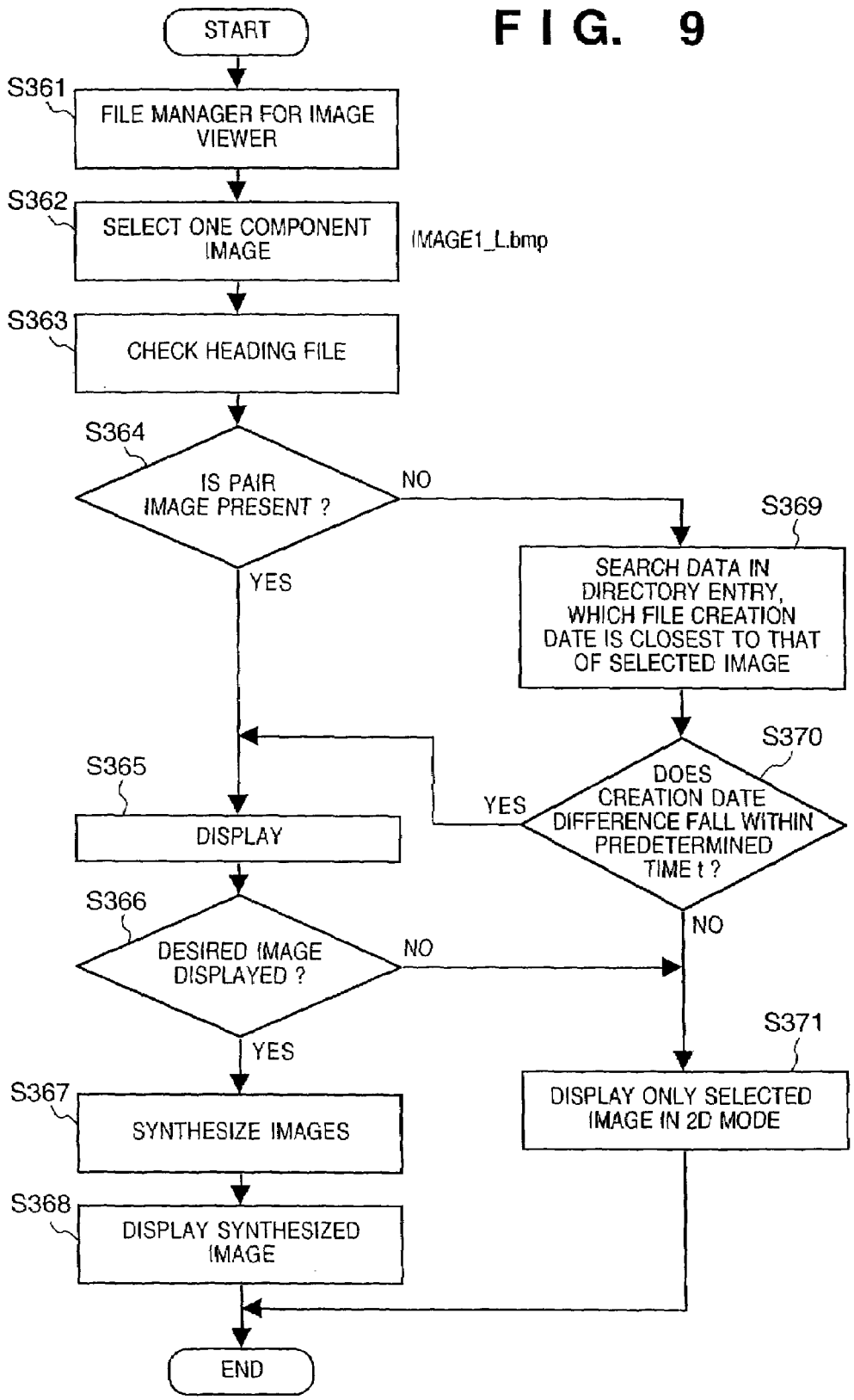
FIG. 9 is a flow chart showing the image reproduction control sequence in the image-picking up/displaying system according to the second embodiment of the present invention.

FIG. 8 is a flow chart showing the recording control sequence of multiple images into the storage apparatus 115, and FIG. 9 is a flow chart showing the control sequence until reproduction and display of a set of images from the storage apparatus 115.

Referring to FIG. 8, two, left and right systems of images are picked up by the two image-picking up optical systems 104a and 104b of the multiple image-picking up apparatus 101 in step S351. Assume that the two image-picking up optical systems 104a and 104b are placed for picking up images to be used for panoramic display. In step S352, the file name of a component image which forms a synthesized image is written in heading information of each of these images, and the image data are recorded in the storage apparatus 115, thus ending this processing.

For example, in the second embodiment, right and left images are respectively named as "IMAGE1-R.bmp" and "IMAGE1-L.bmp", "IMAGE1-L.bmp" as the file name of the other component image that forms a set is written in the heading file of "IMAGE1-R.bmp" as "set composition information", and "IMAGE1-R.bmp" in the heading file of "IMAGE1-L.bmp" as "set composition information".

In the heading information, a new area for storing a file name as attribute information of an image is assured, and the file name is written in this area. In such case, when the multiple image-picking up apparatus 101 picks up more images, the common character strings of file names are named like "IMAGE2", "IMAGE3", . . . .

Note that the file format upon recording is not limited to the bitmap format, and the same applies to various other file formats.

On the other hand, the information to be written in the heading file is not limited to the file name of the pair image. For example, information unique to that image such as the size, update date, and the like of the file may be written. Especially, when an image-picking up/displaying system having three or more image-picking up optical systems processes three or more images, since it is troublesome to write the file names of the remaining component images in a heading file of a given component image, character strings obtained by appending individual identification characters to a common character string can be recorded as attribute information independently of file names. In such case, the same processing can be done.

Furthermore, the creation date of the image is appended as attribute information of the picked-up image. The creation date is appended onto the directory entry of the OS (operating system) in the storage apparatus 115. The directory entry has the same format as that shown in FIG. 6 in the aforementioned first embodiment.

Image reproduction in the second embodiment will be described below using the control sequence shown in FIG. 9.

Upon reproduction of images, the file manager of the viewer program is started, and a file name selection window appears, in step S361. The user selects a component image to be reproduced using the user interface 119 such as a mouse or the like.

That is, in step S362, one (e.g., "IMAGE1-L.bmp") of the previously recorded component images "IMAGE1-R.bmp" and "IMAGE1-L.bmp" is selected.

In step S363, the heading file of the selected component image (in this example, "IMAGE1-L.bmp") is checked. This heading file is written on the directory entry on the memory 113, and describes the name of the pair image to be panoramically synthesized. As shown in FIG. 8, the heading file of "IMAGE1-L.bmp" records "IMAGE1-R.bmp".

In step S364, the memory 113 is searched for data "IMAGE1-R.bmp" to check if the pair image is present. If the pair image is present, "IMAGE1-R.bmp" and "IMAGE1-L.bmp" are simultaneously displayed on the display 103 in step S365, and the user determines in step S366 if the displayed images are his or her choices. If the user determines via the user interface 119 that the displayed images are his or her choices, a set of two component images "IMAGE1-R.bmp" and "IMAGE1-L.bmp" that form a synthesized image are panoramically synthesized in step S367, and a single synthesized image is displayed on the display 103 in step S368, thus ending this processing.

Upon panoramically synthesizing the images, corresponding points of overlapping portions at the boundary of picked-up regions of the two component images "IMAGE1-R.bmp" and "IMAGE1-L.bmp" are determined by, e.g., template matching, and the two images are synthesized at the determined portions.

On the other hand, if the user determines that the two images displayed in step S365 are not his or her choices (NO in step S366), it is determined that an appropriate set of two, right and left images were not selected in step S365, and only one image initially selected by the user in step S362 is displayed in the 2D mode on the display 103 in step S371, thus ending this processing.

The processing in steps S369 to S371 has the same objective as that in steps S311 to S313 in the first embodiment. That is, normally, the file names of two, right and left images to be panoramically synthesized do not always have heading information each indicating pair image information in a synthesized image. For this reason, the file name to be selected cannot often be appropriately determined in step S363. Even in such case, since of a set of two, right and left picked-up image data to be synthesized as a panoramic image are created at a very short time interval, the creation dates of image data recorded in the attribute information in the directory entry in the storage apparatus 115 have a very small time difference. Hence, when the file names of right and left images do not have any right and left identification symbols (NO in step S364), the creation dates in the directory entry of all the files in the storage apparatus 115 are checked, and image data with the creation date closest to that of the image selected in step S362 is selected in step S369.

In step S370, it is checked if the difference between the creation date of the component image found as a pair image, and that of the component image selected in step S362 falls within a predetermined time difference t. Note that this time difference t is the same as that in the first embodiment. If the creation date difference falls within the predetermined time difference t, the two images are selected as component images that form a synthesized image, and a panoramically synthesized image is displayed on the display 103 (steps S366 to S368).

On the other hand, if it is determined in step S370 that the creation date difference does not fall within the predetermined time difference t, the flow advances to step S371, and only the image initially selected in step S362 is displayed in the 2D mode on the display 103 without synthesizing two images.

In this embodiment, the predetermined time t is set as the time required between the first and second depressions of the shutter to pick up images, but the present invention is not limited to this. The predetermined time t may be set arbitrarily. Since the creation date used as the attribute information of this image can be changed by the OS (operating system), if the same creation date is recorded for two picked-up images, two images can be simultaneously reproduced by selecting image files with the same creation date upon reproduction.

On the other hand, when a single, independent two-dimensional image, which is not a component image of an image to be synthesized, is selected in this reproduction mode, for example, when "IMAGE1.bmp" picked up and recorded by a single-eye apparatus (FIG. 5 in this embodiment) is selected, there is no pair image information in a heading file on the directory entry, and the creation date of that file has a large difference from those of other images. With this processing, only one image is consequently displayed in the 2D mode on the display 103.

As described above, by writing information of pair images in each others' heading files (or heading areas) of component images to be panoramically synthesized upon recording, the user need only select "IMAGE1-L.bmp" ("IMAGE1-R.bmp"), and "IMAGE1-R.bmp" (or "IMAGE1-L.bmp") can be simultaneously selected by reading the heading file (or the contents of the heading area) of the selected image. In this way, two, right and left images can be automatically synthesized and displayed.

In the second embodiment, even when a file has no heading information, two, right and left images can be simultaneously selected by a search based on the file creation dates in the directory entry, thus synthesizing and displaying an image.

In the second embodiment, a reproduction example of a panoramic display image has been exemplified. Also, reproduction of a stereo-scopic display image can be explained with reference to the flow charts shown in FIGS. 8 and 9. In this case, however, the two images are processed and displayed for stereo-scopic viewing. In order to display a stereo-scopic image, a method of displaying images on a stereo-scopic display, or a method of switching and displaying right and left images using liquid crystal shutter spectacles may be used. In the former method of displaying images on the stereo-scopic display, two, right and left images must be synthesized by alternately selecting them in units of lines of a frame. In the latter method using the liquid crystal spectacles, processing for switching and displaying right and left images on a single screen is required.

In this embodiment, the image-picking up/displaying system is built by the multiple image-picking up apparatus 101, personal computer 102, and separate type display 103. Alternatively, the present invention can be similarly applied to an integrated image-picking up/displaying system which incorporate these building elements.

Furthermore, in the second embodiment, the storage apparatus 115 of the image-picking up/displaying system is an internal one of the personal computer 102. However, the present invention is not limited to such specific apparatus, and a detachable storage apparatus such as a flash memory may be used.

In the first and second embodiments, component images for generating a panoramic or stereo-scopic image are obtained from the image-picking up apparatus. However, the present invention is not limited to such specific method, and can be applied to recording or reproduction alone of images.

Effect of First Embodiment

As described in detail above, according to the image-picking up/displaying system of the first and second embodiments, since information indicating a component image is appended to each of a set of a plurality of component images that form a synthesized image upon recording, when one of the plurality of images is selected upon reproduction, the remaining images can be simultaneously selected, and a synthesized image can be displayed at once, thus providing a system which is easy for the user to use.

According to a control program of the present invention, and a recording medium that records the control program, the aforementioned image-picking up/displaying system can be smoothly and reliably controlled.

THIRD EMBODIMENT

In the first and second embodiments, upon generating a synthesized image such as a panoramic or stereo-scopic image, a plurality of component images that form the synthesized image must be simultaneously processed. More specifically, when one panoramic or stereo-scopic image is generated from m sets of n component images (i.e., n×m images), selection of a component image by the user, a search for the other component image paired with the selected image by the apparatus, user's confirmation as to whether or not the found component image is paired with the selected component image, various user's operations associated with exceptional processing, e.g., when a search fails, and the like are required. Since such operations are required for all the m sets, as the number m of sets increases, the load on the user becomes heavier. Furthermore, as the number n of component images per set increases, the load on the user similarly becomes heavier.

The load on user's operation is not limited to that upon selecting the component image. For example, when the user wants to execute the same processing (e.g., gradation conversion) for all the m synthesized images, he or she must select and process component images that form the synthesized images one by one, resulting in a heavy load on the user.

The object of the third embodiment is to provide an image processing apparatus and method, which can eliminate such troublesome operations, and can automatically execute the processing, executed for arbitrary one image of a set of images to be processed together, for the remaining images.

In the third embodiment, attribute information or identification information indicating a component image that forms a synthesized image is added to the respective component images that form the synthesized image like in the first and second embodiments. The characteristic feature of the third embodiment lies in that upon correcting gradation of a given component image, the remaining component image or images is or are automatically selected, and is or are similarly subjected to gradation correction. Image processing such as gradation conversion for a component image is often unique to a panoramic synthesis objective or to a stereo-scopic viewing objective. For this reason, in the third embodiment, an identifier (to be referred to as an "objective identifier" ("P" to be described later) hereinafter for the sake of simplicity) for identifying if a component image is for panoramic synthesis objective or stereo-scopic viewing objective is used.

Figure 10:
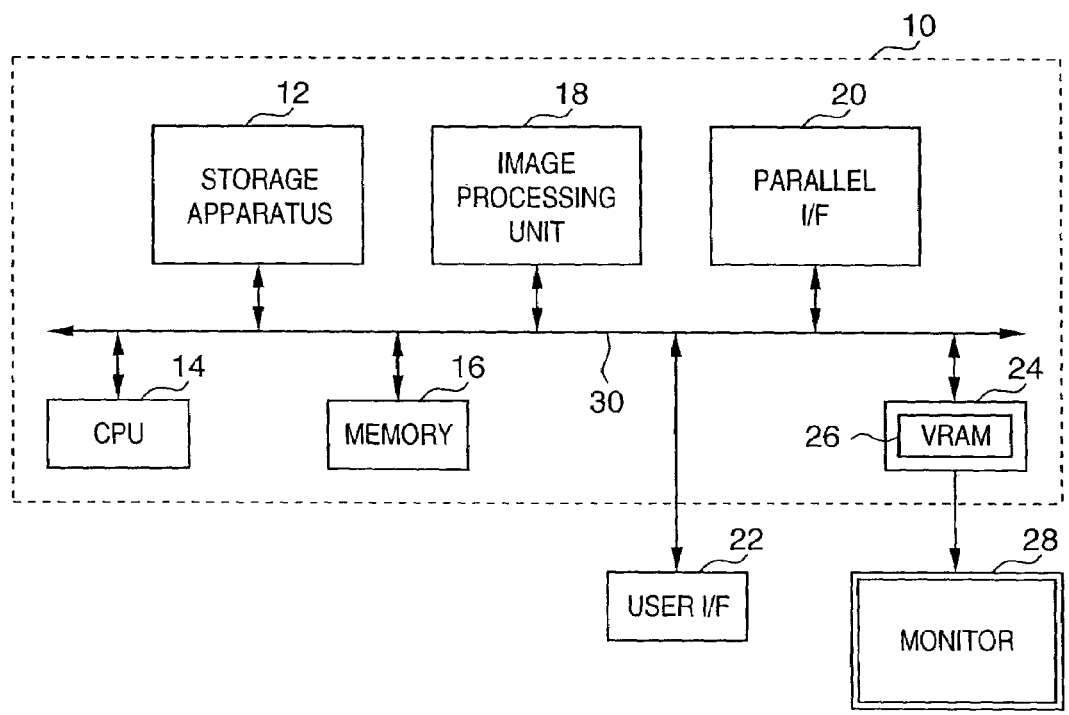
FIG. 10 is a schematic block diagram showing the arrangement according to the third embodiment of the present invention.

FIG. 10 shows the arrangement of an image displaying system according to the third embodiment. An image processing apparatus 10 of the third embodiment basically comprises a personal computer. Reference numeral 12 denotes a storage apparatus for storing a plurality of images, various programs, and data; 14, a CPU; 16, a memory; 18, an image processing unit; 20, a parallel interface; 22, a user interface; 24, a display controller 26, a VRAM; 28, a monitor display (to be referred to as a monitor hereinafter); and 30, a CPU bus.

Note that an electronic still camera or video camera may be connected to this personal computer system 10.

The monitor 28 comprises a CRT monitor or liquid crystal monitor. The CPU 14 loads a program stored in the storage apparatus 12, and controls the respective units in accordance with the program.

The operation of displaying an image stored in the storage apparatus 12 on the monitor 28 will be explained below.

Image data is read out from the storage apparatus 12, and is transferred to the memory 16 via the CPU bus 30. The image processing circuit 18 performs processing such as disparity correction (required for stereo-scopic viewing) and the like on the memory 16. The display controller 24 loads image data on the memory 16 onto the VRAM 26 and displays it on the monitor 28. The user interface 22 is used for inputting various instructions by the user. An image captured from an external device via the parallel interface 20 can also be displayed on the screen of the monitor 28, and the same basic operation is made in such case.

Assume that the storage apparatus 12 stores a pair of two, right and image data files (image data of component images) that form a panoramic image.

These image data may be picked up by a camera or created by a computer graphics program, or may be combinations of such data. In this embodiment, assume that images are picked up by a multiple image-picking up apparatus.

Figure 11:
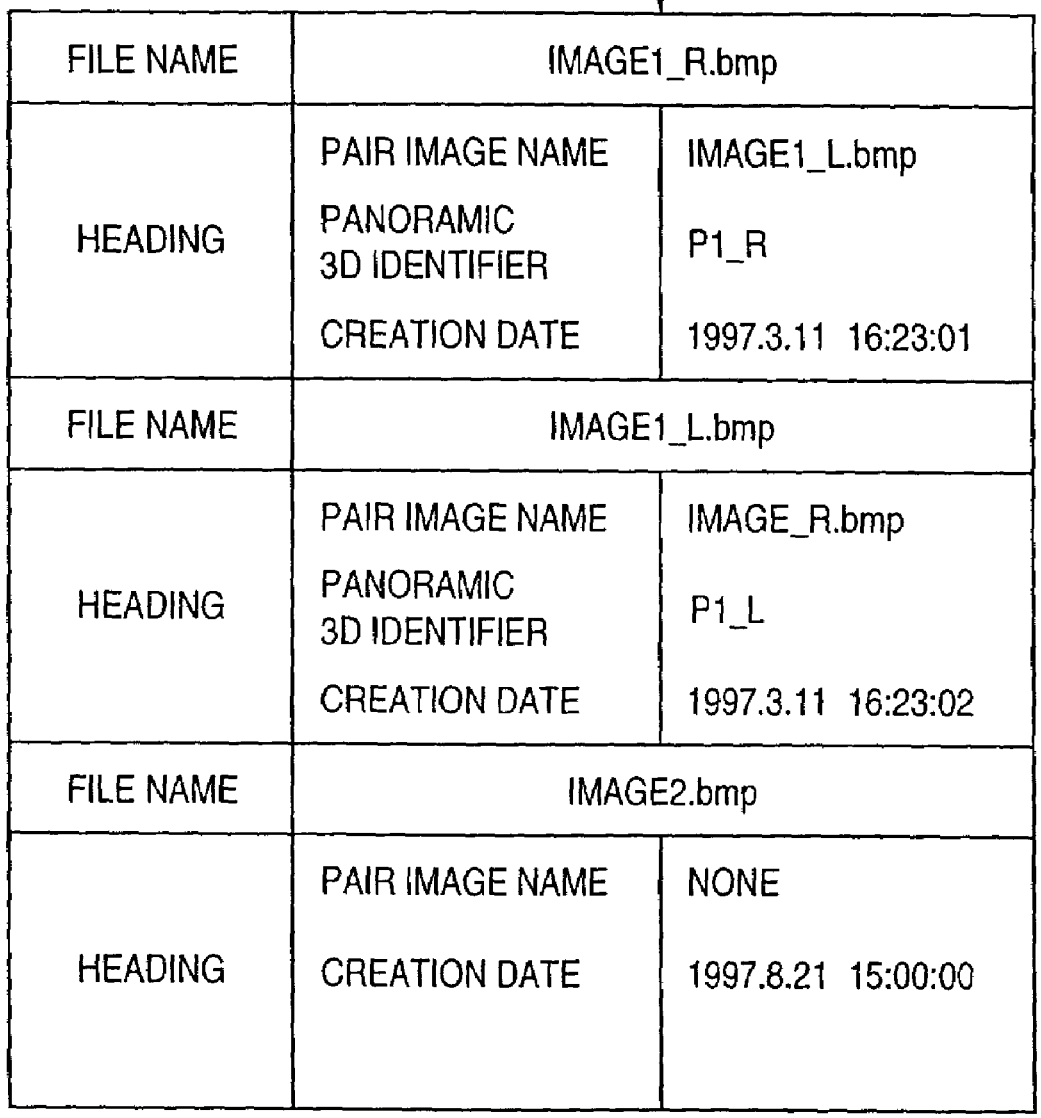
FIG. 11 shows an example of files and their attribute information stored in a storage apparatus 12 of the third embodiment.

FIG. 11 shows the storage format in the storage device 12, i.e., the file name, attribute, and the like.

In the example shown in FIG. 11, a basic file name is "IMAGE1". In order to identify the components of a common panoramic image, "-R" is appended to the basic file name of the right image, and "-L" to that of the left image. Note that the file name format itself is not limited to such specific format.

That is, as in the first and second embodiments above, image data of the third embodiment has a "file name" as an "inter-set identifier" and "-R" or "-L" as an "intra-set identifier".

As an extension, the one indicating an image file format (bmp indicating the bitmap format in FIG. 11) is used. Note that the file format is not limited to the bitmap format.

Hence, the storage apparatus 12 stores image files "IMAGE-R.bmp" and "IMAGE-L.bmp".

In the third embodiment, in order to indicate that the image files "IMAGE-R.bmp" and "IMAGE-L.bmp" are a set of images for panoramic viewing, a "panoramic 3D identifier name" as an "objective identifier" is further appended. The "panoramic 3D identifier name" assumes a value "P1" when the objective of a component image is panoramic viewing display. That is, the heading field of the image file "IMAGE-R.bmp" stores:

Pair image file name: "IMAGE-L.bmp"
Panoramic 3D identifier name: P1-R

The heading field of the other image file "IMAGE-L.bmp" stores:

Pair image file name: "IMAGE-R.bmp"
Panoramic 3D identifier name: P1-L

Note that the heading field may also store a creation date in addition to the pair image file name, as shown in FIG. 11. Furthermore, the heading field may include information unique to the image such as:

Size of pair image file
Update date

FIG. 11 also shows an image file "IMAGE2.bmp" for 2D display and its attribute information for the purpose of comparison. Since this image file is for 2D display, the pair image file name is blank in the heading field. Note that the panoramic 3D identifier name as the "objective identifier" for a 2D display objective is blank in the example shown in FIG. 11.

The "panoramic 3D identifier name" has an identification value "P" indicating panoramic synthesis, and a number "1" for identifying an image. if a set includes three or more images, image identification numbers like "_1", "_2", "_3", and the like may be appended. The effect of the image identification number will be explained below.

That is, panoramic synthesis often uses a set of three or more images. In such case, if the heading field of one component image includes the file names of all the remaining component images, the heading field must have a complicated format, and the heading field storage area cannot often be assured. Hence, as described above, a character string (e.g., P1-R and P1-L in FIG. 11) appended with a character string (image identification number) common to each set is recorded in an area (the heading area in the example shown in FIG. 11) independently of the file name. With this format, images can be managed based on the image identification numbers independently of their file names. For example, even when the user changes the file name of a given component image, component images that should belong to a set including the changed component image can be identified.

Each image file is appended its creation date. The creation date is recorded in a directory entry of the storage apparatus 12. FIG. 12 shows the structure of the directory entry in the storage apparatus 12. The directory entry includes a file name column, extension column, attribute information column, and head cluster column of files stored in the storage apparatus 12. Such structure is known to those who are skilled in the art. The head cluster column shows the head cluster in a FAT of each file in hexadecimal notation.

Figure 14:
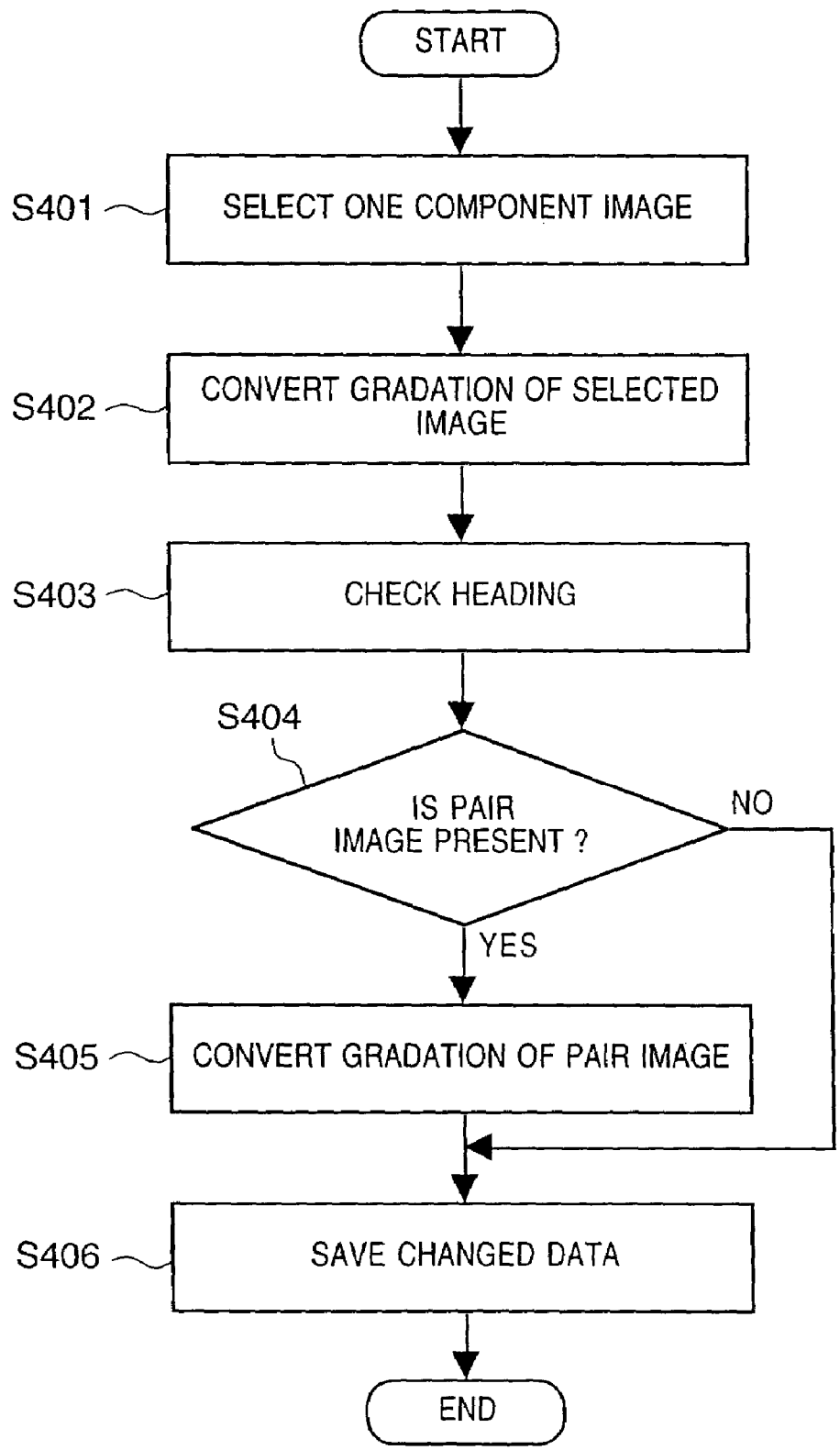
FIG. 14 is a flow chart of gradation conversion of the third embodiment.

For the panoramic synthesis or stereo-scopic viewing display objective, image processing done for a given component image should also be done for other component images. If different component images are processed in different ways, a panoramically synthesized image or stereo-scopically displayed image based on such component images appears unnatural. To solve such problem, in the third embodiment, image processing among component images is standardized. FIG. 14 is a flow chart for explaining the control sequence for standardizing image processing among component images.

FIG. 13 shows the types of image processing supported in the third embodiment. In this example, gradation conversion, smoothing, and edge emphasis are prepared. An application program of the personal computer of the third embodiment provides a graphical user interface (GUI) shown in FIG. 13.

A case will be explained below with reference to the flow chart in FIG. 14 wherein the user selects an icon "gradation conversion".

The flow chart in FIG. 14 explains the operation for converting gradation characteristics of image files "IMAGE-R.bmp" and "IMAGE-L.bmp" that form a panoramic image. In step S401, a file manager for displaying the file names of a viewer software program of the third embodiment is started. As a result, the file names of all the files stored in the storage apparatus 12 are displayed on the monitor 28, and the user selects one component image file to be gradation-converted at the user interface 22. For example, assume that a file "IMAGE-L.bmp" is selected.

The image file "IMAGE-L.bmp" selected in step S402 is gradation-converted. Gradation conversion will be explained below taking as an example a case wherein gradation characteristics having an 8-bit gray scale are binarized by a threshold value of level 128 (of course, the present invention is not limited to such specific gradation conversion).

Assume that the image file IMAGE-L.bmp to be converted has an image size of m×n pixels, L(i,j) (for $0 \leq L(i,j) \leq 255$) represents the luminance level value of each point, and L'(i,j) represents the luminance level value after processing. Then, binarization is done like:

$$L'(i, j) = 1 \quad \text{(when } L(i, j) \geq 128\text{)} \tag{1}$$
$$\phantom{L'(i, j) =} 0 \quad \text{(when } L(i, j) < 128\text{)}$$

As a result, the image IMAGE-L.bmp is converted into 1-bit data.

However, the image IMAGE-R.bmp remains 8-bit data. When two images having different gradation levels are synthesized, a very unnatural image is obtained. Hence, the image IMAGE-R.bmp must be subjected to the same gradation conversion as that for the image IMAGE-L.bmp. Conventionally, the user manually performs the same gradation conversion for the image IMAGE-R.bmp.

In the third embodiment, an image to be paired with the image IMAGE-L.bmp is searched for, and the found image is gradation-converted in step S403 and the subsequent steps. In step S403, the contents of the heading field of the image file "IMAGE-L.bmp", which has been selected and gradation-converted by the user, are read to check the presence/absence of a pair image. In the example shown in FIG. 11, since the heading field of the image file "IMAGE-L.bmp" contains "IMAGE-R.bmp" as the pair image file name, it is checked in step S404 if the image file "IMAGE-R.bmp" is present in the storage apparatus 12.

If the pair image is found (YES in step S404), the pair image file "IMAGE-R.bmp" is subjected to the same gradation conversion while displaying the pair image file name "IMAGE-R.bmp" in step S405. That is, assume that the image file "IMAGE-R.bmp" to be converted has an image size of m'×n' pixels, R(i,j) (for $0 \leq R(i,j) \leq 255$) represents the luminance level value of each point, and R'(i,j) represents the luminance level value after processing. Then, binarization is done like:

$$R'(i, j) = 1 \quad \text{(when } R(i, j) \geq 128\text{)} \tag{2}$$
$$\phantom{R'(i, j) =} 0 \quad \text{(when } R(i, j) < 128\text{)}$$

With this processing, both the image files "IMAGE-L.bmp" and "IMAGE-R.bmp" have 1-bit gray scales, and the image obtained by synthesizing these images appears natural.

In step S406, the user checks the final gradation conversion result, and if the result is good, the two, gradation-converted image files "IMAGE-L.bmp" and "IMAGE-R.bmp" are saved by overwriting.

On the other hand, if it is determined in step S404 that the image file "IMAGE-R.bmp" to be paired is not present in the storage apparatus 12, the control ends.

In this way, when the user selects and gradation-converts one of component images of a synthesized image, the same processing is automatically done for the remaining component images. Hence, the user need neither search for component images nor repeat processing for these component images, thus reducing the load on the user.

Modification of Third Embodiment

In the third embodiment, a panoramic image obtained by two images has been exemplified. Even in a stereo-scopic image made up of two or more images, when a given component image is gradation converted, another component image to be paired is similarly searched for using the inter- and intra-set identifiers, and is gradation-converted, thus obtaining a balanced stereo-scopic image.

As in the first and second embodiments, the remaining component image in the set can be found by a search using the creation date of that image data.

The storage apparatus 12 may comprise a detachable one such as a flash memory card in place of a fixed memory such as a magnetic disk.

The image processing of the present invention is not limited to the above-mentioned gradation conversion, smoothing, and edge emphasis, and also include color conversion, gradation correction, color correction, image enlargement, and file format conversion since substantially the same processing as in the above gradation conversion is dome except for its processing contents. That is, when one of a plurality of component images that form a synthesized image is subjected to predetermined processing, the same processing can be performed for the remaining component images.

Rotation of Image) . . . Modification of Third Embodiment

In case of panoramic synthesis, the processing to be executed may be rotation of an image. This is because a plurality of component images to be panoramically synthesized have the same rotation angle if they are picked up by a single image-picking up apparatus. Hence, if one component image has been rotated, other component images should be similarly rotated as well. This modification has a function of correcting rotation of each image in such case.

Figure 15:
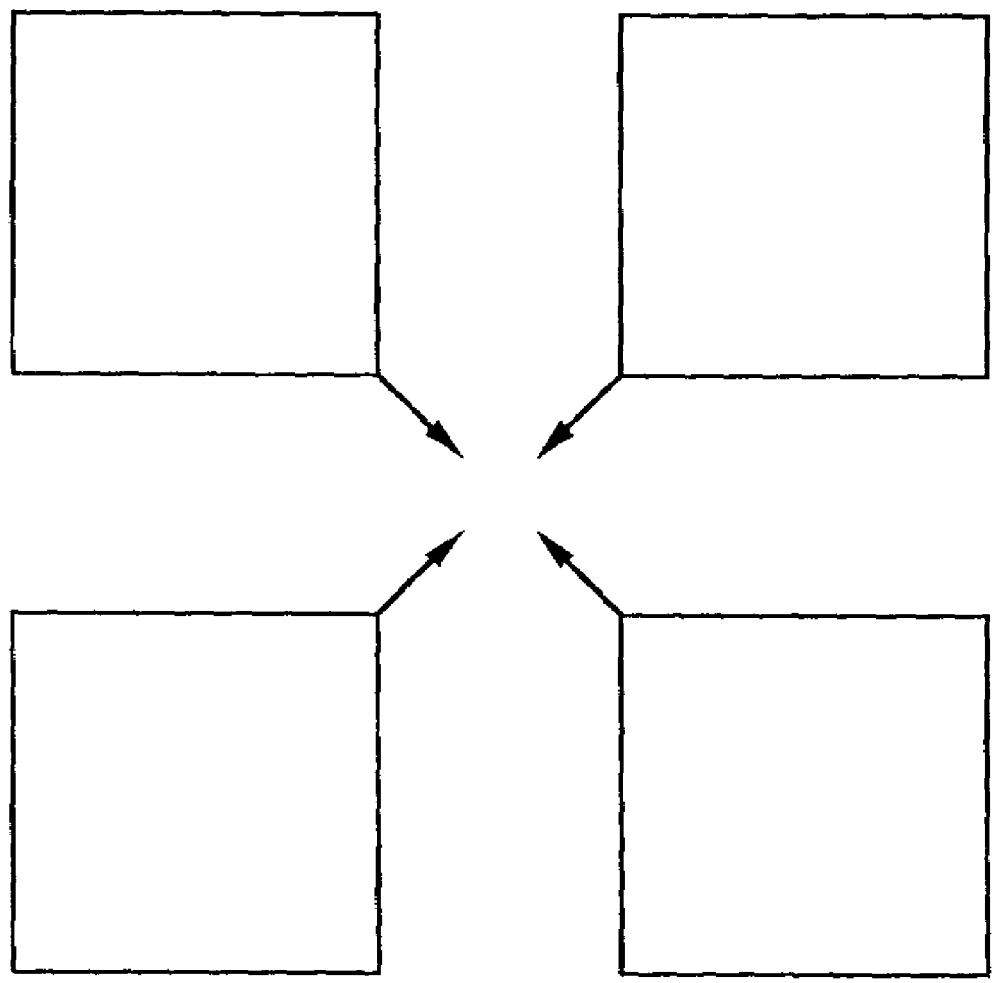
FIG. 15 is a view for explaining generation of a panoramic image in the third embodiment.
Figures 16, 17:
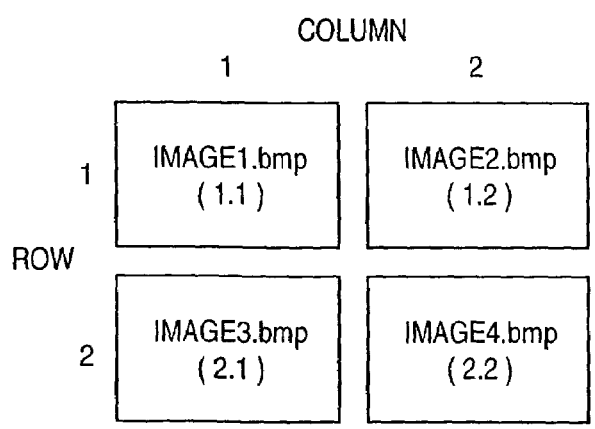
FIG. 16 is an explanatory view of file names and their attribute information used in rotation.
FIG. 17 shows the layout of the respective images shown in FIG. 16 on a synthesized image.

In case of image rotation, each others' position information must be included in the attribute information unlike in the above-mentioned processing. The operation will be explained in detail below. A case will be exemplified wherein a panoramic image is generated by synthesizing four (2 rows×2 columns) component images, as shown in FIG. 15. Assume that four images to be synthesized are stored in the storage apparatus 12 as four image files "IMAGE1.bmp", "IMAGE2.bmp", IMAGE3.bmp", and "IMAGE4.bmp", as shown in FIG. 16. The heading field of each image file contains a panoramic identifier name and image position. These values are:

Panoramic identifier name: P1

Image position column: Position on synthesized image

Since the panoramic identifier name is "P1", this means that the individual component images are those of a set of four images. Assume that the four image files "IMAGE1.bmp", "IMAGE2.bmp", IMAGE3.bmp", and "IMAGE4.bmp" are synthesized in the layout shown in, e.g., FIG. 17.

For the heading field, an area for storing only a file name as attribute information of an image is assured. The image file format is not limited to a bitmap format, and various other file formats may be used. Information to be written in the heading field is not limited to the above-mentioned example.

Figure 18:
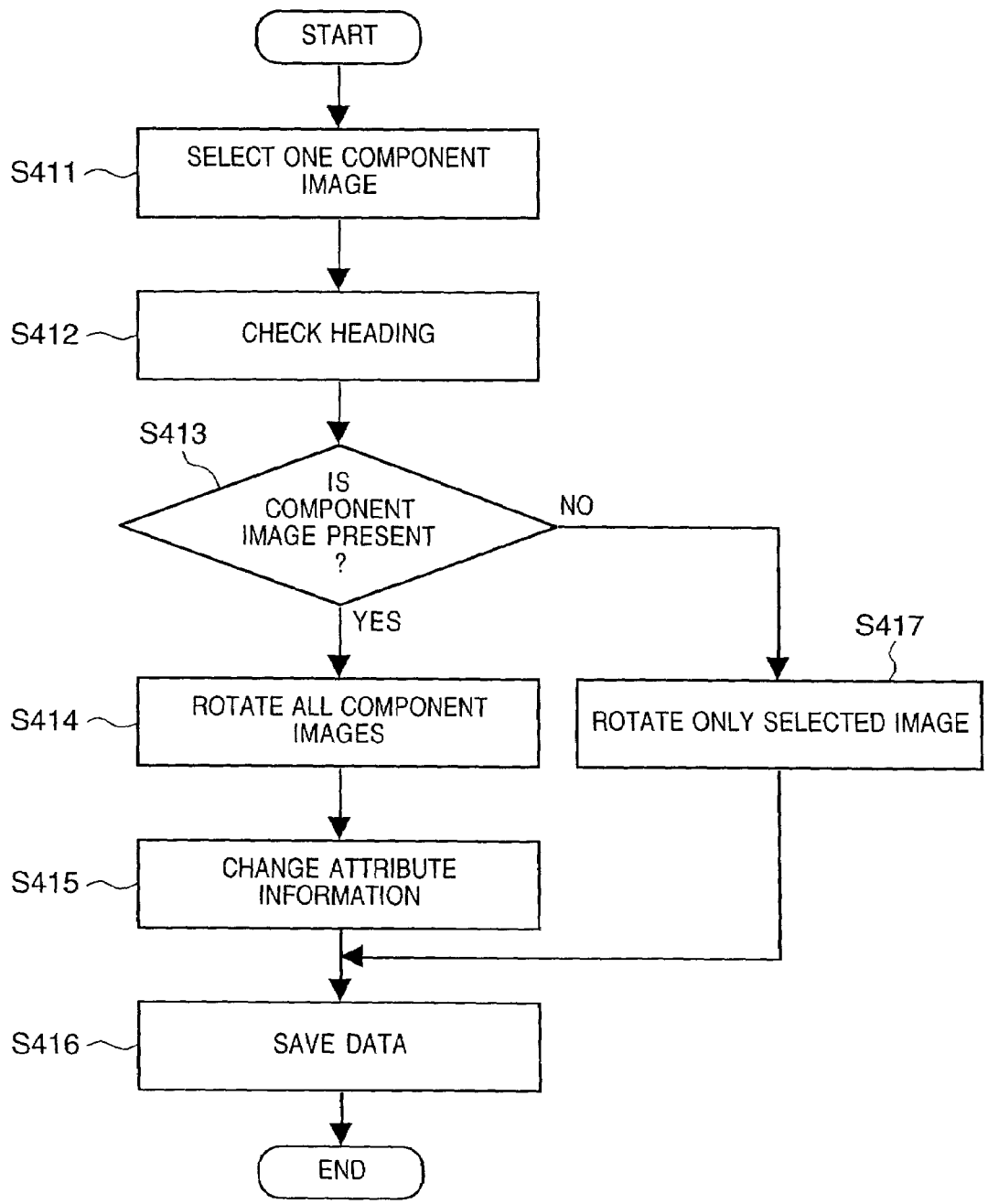
FIG. 18 is a flow chart of rotation.

A case will be examined below wherein "IMAGE1.bmp" of the four component images is read out, and is rotated 90° counterclockwise. FIG. 18 shows its operation flow chart.

In step S411, rotation processing software is started. As a result, the file names of files stored in the storage apparatus 12 are displayed, and the user selects an image file to be rotated at the user interface 22. For example, assume that the file "IMAGE1.bmp" is selected.

The contents of the heading field of the selected file "IMAGE1.bmp" are read in step S412, and an image file having the same panoramic identifier name as its panoramic identifier name "P1" is searched for in step S413. In the example shown in FIG. 16, image files "IMAGE2.bmp", "IMAGE3.bmp", and "IMAGE4.bmp" having the identifier name "P1" are found.

If it is determined in step S413 that the image files having the same panoramic identifier name are present, all the found image files are rotated in the designated direction in step S414. As a result of rotation of these files, since the positions of the individual component images with respect to the panoramically synthesized image have been changed, the image position information in the heading field of each image file is updated to indicate a correct positional relationship in step S415.

Figure 19:
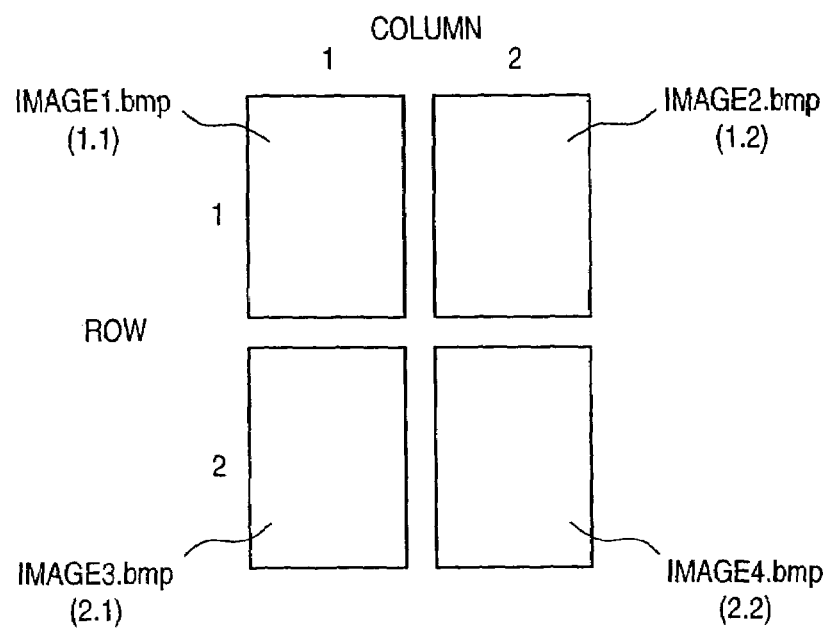
FIG. 19 shows the layout of simple rotation results of the respective images on a synthesized image.

For example, when the entire panoramically synthesized image is rotated 90° counterclockwise, the layout of the individual component images in the synthesized image also changes. That is, when all the component images are rotated but their layout information is not changed, the respective component images are located on the panoramically synthesized image, as shown in FIG. 19. That is, the entire panoramically synthesized is not rotated normally although the individual component images have been rotated. In the third embodiment, the image position, i.e., row information and column information indicating the layout in the synthesized image, in the heading field of each component image are changed. In this case, since the component images are rotated 90° counterclockwise, the attribute information in the heading field of each image file is changed to:

IMAGE1.bmp: 1st row, 1st column→2nd row, 1st column

IMAGE2.bmp: 1st row, 2nd column→1st row, 1st column

IMAGE3.bmp: 2nd row, 1st column→2nd row, 2nd column

IMAGE4.bmp: 2nd row, 2nd column→1st row, 2nd column

Figure 20:
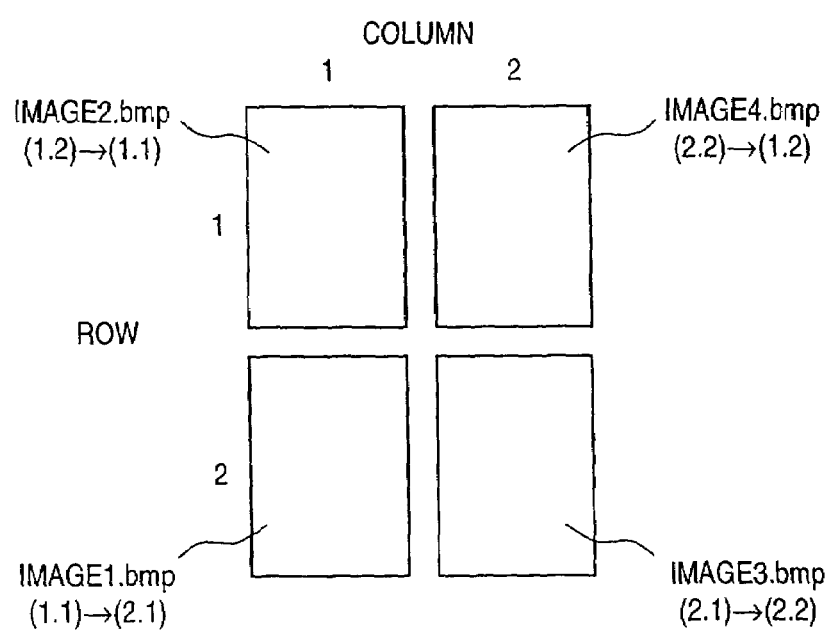
FIG. 20 shows the layout of the respective images on a synthesized image after rotation.

According to the changed heading information, the respective component images are normally located on the panoramically synthesized image, as shown in FIG. 20.

If the user approves the rotation result, the changed data of all the image files "IMAGE1.bmp", "IMAGE2.bmp", "IMAGE3.bmp", and "IMAGE4.bmp" are saved by overwriting in step S416.

On the other hand, if it is determined in step S413 that image files having the same panoramic identifier name are not present, the selected image file alone is rotated in the designated direction in step S417, and if the user approves the rotation result, the rotated data is saved using the same file name in step S416.

In this fashion, when one of a plurality of component images that form a synthesized image is rotated, the remaining images can be similarly rotated, and information that defines the positional relationship on the synthesized image can be normally updated. More specifically, the user need neither perform identical processing for the individual component images, nor individually change the information that defines the relationship with respect to the synthesized image.

In the above description, component images are rotated. Even when the processing to be executed is reverse processing, substantially the same operations as in rotation are made except for the processing contents. More specifically, when one of a plurality of component images that form a synthesized image is subjected to predetermined processing, the remaining component images are also subjected to the same processing, following the flow chart shown in FIG. 18. That is, the user need neither perform identical processing for the individual component images, nor individually change the information that defines the relationship with respect to the synthesized image.

Image Cutout Processing) . . . Second Modification of Third Embodiment

When a partial image region is cut out from a panoramically synthesized image, the region may extend across two or more component images. In such case, when image data is cut out from one component image, it is preferably automatically cut out from another component image, which is panoramically synthesized at the neighboring position of that component image. The second modification of the third embodiment relates to automatic cutout of image data.

Figure 21:
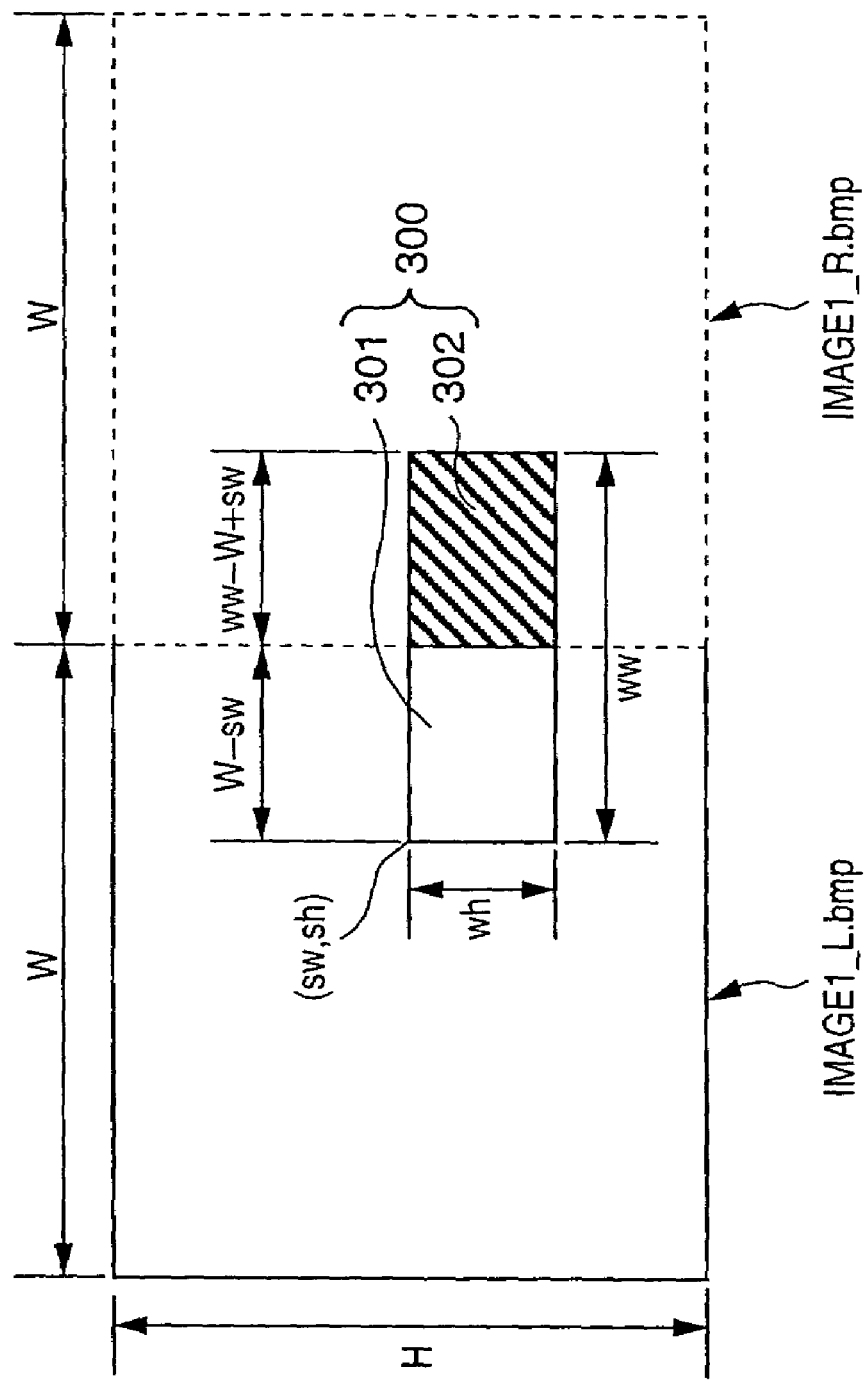
FIG. 21 is an explanatory view of a cutout range extending over a plurality of images.

Image cutout will be explained below taking as an example FIG. 21.

Assume that a panoramic image is made up of two component images "IMAGE-R.bmp" and "IMAGE-L.bmp". The two component images "IMAGE-R.bmp" and "IMAGE-L.bmp" are synthesized into a panoramic image, so that the left end of an image of the image file "IMAGE-R.bmp" just matches the right end of an image of the image file "IMAGE-L.bmp", as shown in FIG. 21. Of course, these component images may partially overlap each other.

Assume that a rectangular region 300 having a point designated by the user as a start point is cut out from the left image (image file "IMAGE-L.bmp). If the entire rectangular region 300 is included in only one image (image file "IMAGE-L.bmp" or "IMAGE-R.bmp"), no problem is posed. However, when the rectangular region 300 extends across two source images (image files "IMAGE-L.bmp" and "IMAGE-R.bmp"), as shown in FIG. 21, that portion in the rectangular region 300, which is included in the image of the image file "IMAGE-L.bmp", must be cut out from the image of the image file "IMAGE-R.bmp".

Assume that the component images "IMAGE-L.bmp" and "IMAGE-R.bmp" have an image size of H×W, the rectangular region 300 is present in the component image "IMAGE-L.bmp", the start point of the region 300 is located at a coordinate position (sw, sh) (0<sw<W, 0<sh<H), and the rectangular region 300 has a size of (ww, wh).

Figure 22:
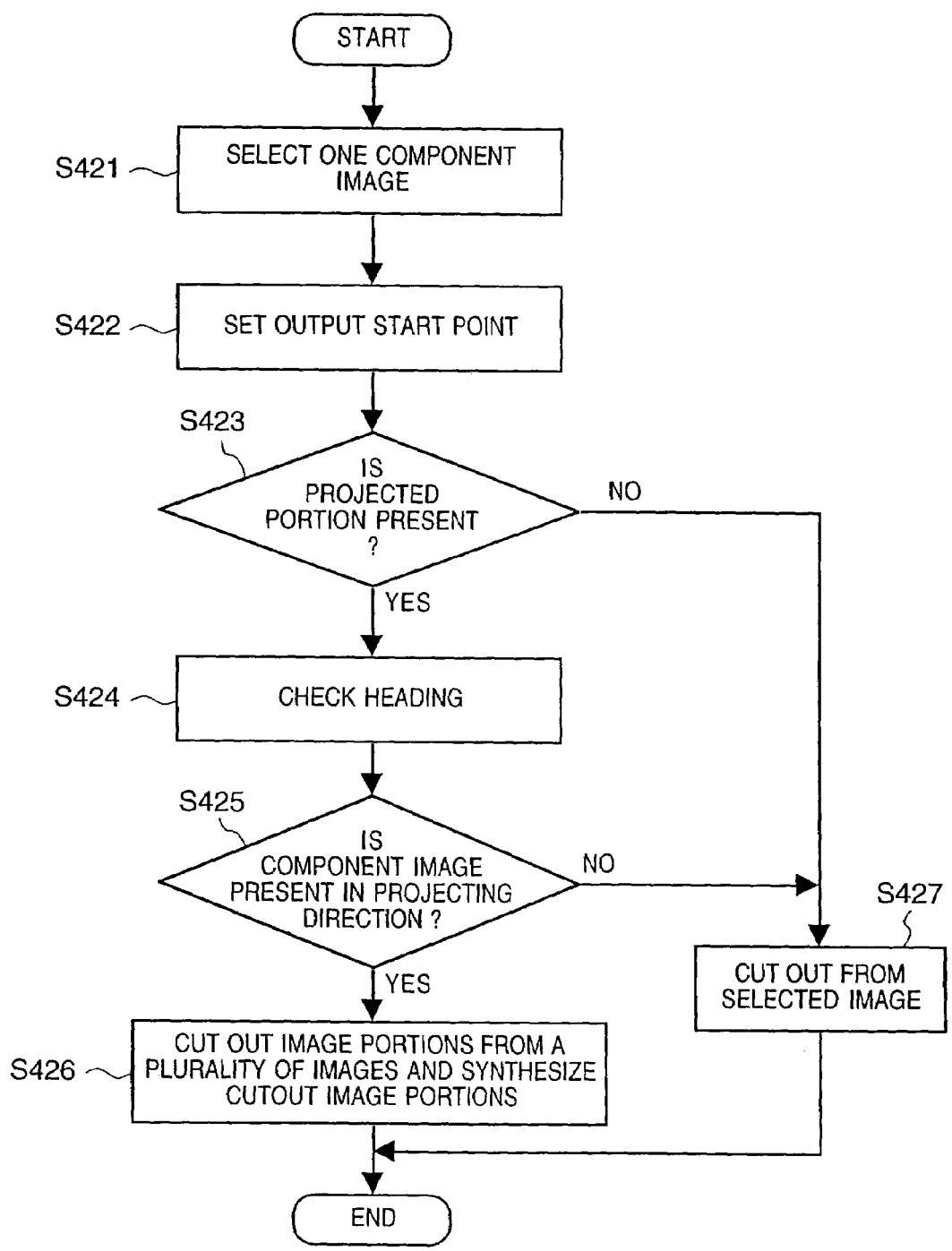
FIG. 22 is a flow chart of cutout processing.

FIG. 22 is a flow chart showing the operation for cutting out an image in a designated region.

When cutout software is started, the file names of component files stored in the storage apparatus 12, and the like are displayed, and the user selects arbitrary one component image file at the user interface 22. Assume that the image file "IMAGE-L.bmp" is selected.

In step S422, the user determines the start point (sh, Sw) of the cutout region 300 on the image of the selected left image file "IMAGE-L.bmp". In step S423, it is checked if the cutout region is completely included in the left image file "IMAGE-L.bmp". That is, it is checked if:

$$sw+ww>W \quad (3)$$

$$sh+wh>H \quad (4)$$

When inequality (3) holds, the cutout region 300 projects rightward from the selected component image "IMAGE-L.bmp". When inequality (4) holds, the cutout region 300 projects downward from the image of the selected component image "IMAGE-L.bmp".

If it is determined in step S423 that the cutout region 300 projects rightward or downward from the image of the selected image file "IMAGE-L.bmp", the heading information of the selected image file "IMAGE-L.bmp" is checked in step S424 to check in step S425 if there is a component image file to be located on the right side of the selected component image "IMAGE-L.bmp". In this example, a component image "IMAGE-R.bmp" will be found as the component image to be located on the right side of the selected component image "IMAGE-L.bmp".

If the image file of an image to be located on the right side is found, but is not actually stored in the storage apparatus 12 (NO in step S425), image data of the designated range is cut out from the selected component image "IMAGE-L.bmp" alone in step S427.

If it is determined in step S425 that a component image which partially includes the projecting portion of the cutout region 300 is found, a rectangular region 301 having the start point (sw, sh) and a size (W−sw, wh) is cut out from the selected left component image "IMAGE-L.bmp". On the other hand, a rectangular region 302 having a start point (0, sh) and a size (ww−W+sw, wh) is cut out from the found right component image "IMAGE-R.bmp" in step S427. In step S426, image data cut out as the regions 301 and 302 are synthesized at their boundary and the synthesized data is displayed.

On the other hand, if it is determined in step S423 that the cutout region does not project, i.e., if the cutout region 300 is completely included in the component image "IMAGE-L.bmp" selected in step S421, the cutout region is cut out from the selected component image "IMAGE-L.bmp" and is displayed in step S427.

In this way, in the second modification of the third embodiment, when the user instructs to cut out a specific region from one component image that forms a synthesized image, even when that specific region extends over another component image, required image portions are automatically cut out from these images, and are synthesized. Hence, the same image as that cut out from the synthesized image itself can be obtained from image data of component images. Since the synthesized image normally has lower image quality than its component images, the second modification of the third embodiment can cut out an image in a specific range with higher image quality than that of an image cut out from the synthesized image itself. This modification is more effective than when no synthesized image is saved.

Image Transfer) . . . Third Modification of Third Embodiment

The third modification will be explained below. In this modification, when the user instructs to transfer a given component image that forms a synthesized image to an external apparatus, the remaining component images are similarly transferred to the external apparatus.

Figure 23:
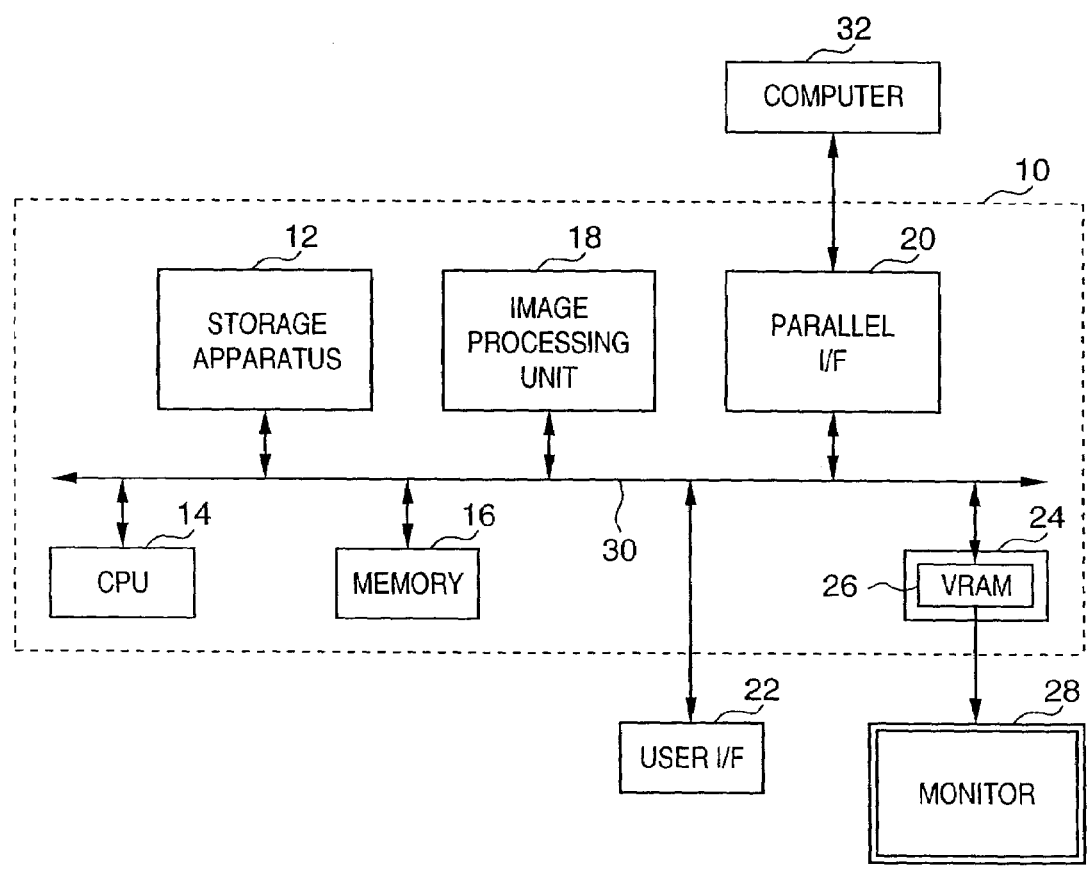
FIG. 23 is a schematic block diagram for explaining external transfer.

For example., as shown in FIG. 23, a computer 32 is connected to the parallel interface 20, and the user wants to simultaneously transfer image files of component images stored in the storage apparatus 12 to the computer 32. Assume that the storage apparatus 12 stores a set of two, right and left images "IMAGE-R.bmp" and "IMAGE-L.bmp" that form a stereo-scopic image, as shown in FIG. 11.

Figure 24:
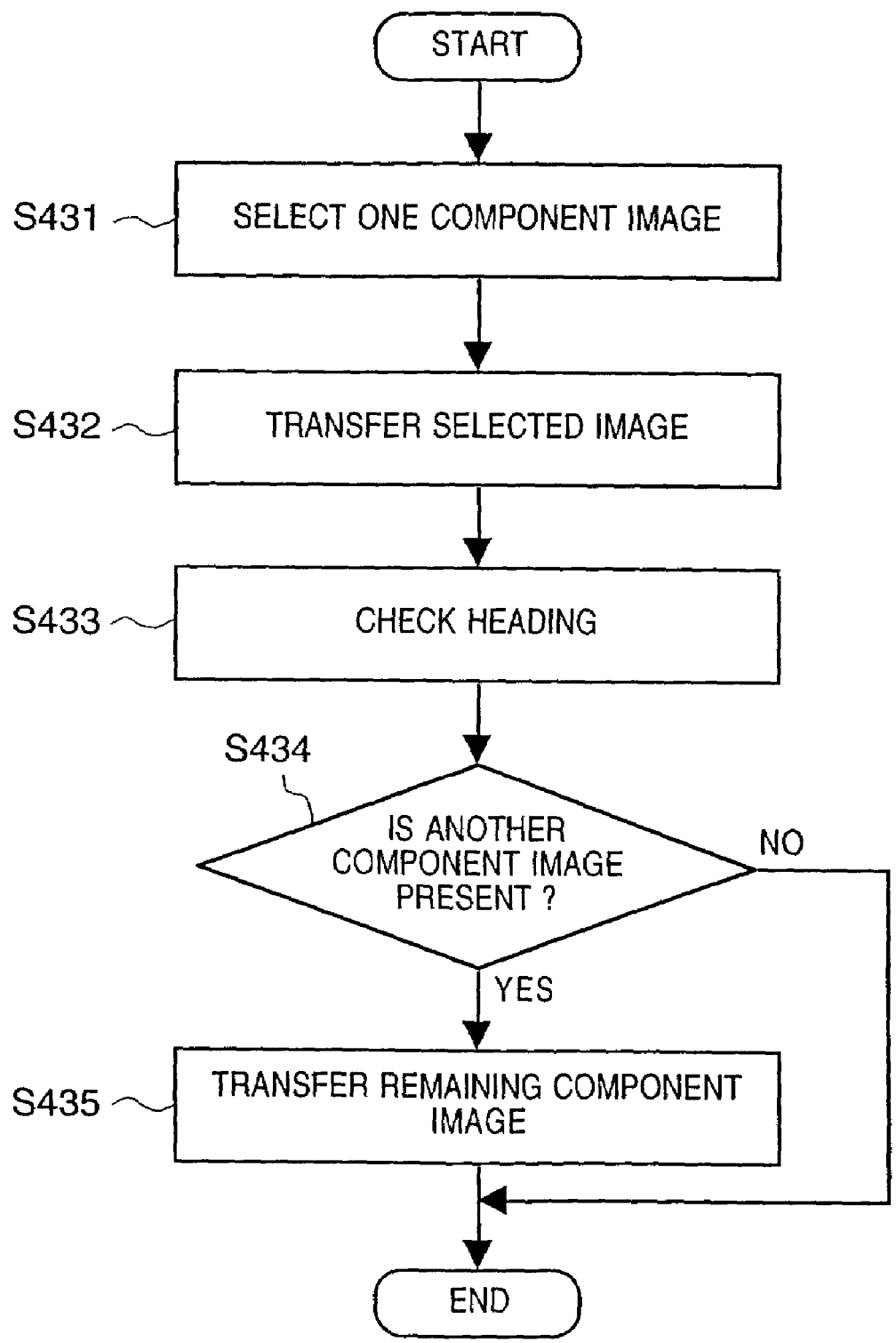
FIG. 24 is a flow chart of transfer.

FIG. 24 is an operation flow chart of the third modification. When transfer software is started, the file names of all the component images stored in the storage apparatus 12 are displayed, and the user selects one component image file to be transferred to the external apparatus at the user interface 22 in step S431. For example, assume that the user selects the file "IMAGE-L.bmp".

In step S432, the selected image file "IMAGE-L.bmp" is transferred from the parallel interface 22 to the computer 32. In step S433, the contents of the heading field of the transferred image file are read. In step S434, the presence/absence of a component image to be paired with the selected component image "IMAGE-L.bmp" is checked on the basis of the read heading information. If other component files are found, all the image files of the found component images are similarly transferred from the parallel interface 22 to the computer 32 in step S435.

In this fashion, by designating transfer of one of all the images required for generating a synthesized image, all the images can be transferred.

Another Modification of Third Embodiment

The third embodiment may be applied to either a system constructed by a plurality of equipments or an apparatus consisting of a single equipment.

The scope of the present invention includes a case achieved by supplying a program code of software for realizing the functions of the above embodiment to a computer in an apparatus or system connected to various devices so as to operate the various devices to implement the functions of the above embodiment, and operating the various devices in accordance with the stored program by the computer (CPU or MPU) of the apparatus or system.

In this case, the program code itself of software realizes the functions of the above-mentioned embodiment, and the program code itself, and means for supplying the program code to the computer (e.g., a storage medium which stores the program code) constitute the present invention. As the storage medium for storing the program code, for example, a floppy disk, hard disk, optical disk, magneto-optical disk, CD-ROM, magnetic tape, nonvolatile memory card, ROM, and the like may be used.

Not only when the functions of the above embodiment are implemented by executing the supplied program code by the computer but also when the functions of the above embodiment are implemented by collaboration of the program code and an OS (operating system) running on the computer, another application software, or the like, such program code is included in the embodiment of the present invention.

Furthermore, when the supplied program code is stored in a memory equipped on a function extension board of the computer or a function extension unit connected to the computer, a CPU or the like equipped on the function extension board or unit executes some or all of actual processes on the basis of the instruction of that program code, and the functions of the above embodiment are implemented by those processes, such case is also included in the present invention.

Advantages of Third Embodiment

As can be easily understood from the above description, according to the third embodiment, the processing executed by designating one of a plurality of images that form a synthesized image can be automatically executed for the remaining images. Hence, the user need not repeat identical processing for individual images.

FOURTH EMBODIMENT

In the first and second embodiments, upon generating a synthesized image such as a panoramic or stereo-scopic image, a plurality of component images that form the synthesized image must be simultaneously processed. That is, when more than one arbitrary image of a set of images are processed, the remaining images remain unprocessed. For this reason, when identical processing is to be executed for the entire synthesized image such as a panoramic image or stereo-scopic image, images that form the synthesized image must be selected and processed one by one, resulting in a heavy load on the user. In the third embodiment, to solve this problem, when image processing is executed for one component image, that image processing is automatically executed for other component images.

The fourth embodiment assumes the following image processing.

For example, when a set of created images are deleted from a storage medium, the user must repeat deletion in correspondence with the number of images in the conventional apparatus. On the other hand, when one component image that forms a stereo-scopic image is deleted, the attribute of the other component image must be changed to that which disables stereo-scopic viewing. That is, when a set of images are processed together, if the user selects and, e.g., deletes one arbitrary image, he or she must appropriately process the remaining images by himself or herself. An image processing apparatus of the fourth embodiment is directed to such deletion of images.

The image processing apparatus of the fourth embodiment has the same arrangement (FIG. 10) as that of the image processing apparatus of the third embodiment. In the fourth embodiment, attribute information indicating an association with a synthesized image is appended to each of the synthesized image and component images that form the synthesized image. Upon deleting a given image, new attribute information is automatically set in the remaining component images.

The storage format of image files in the storage apparatus 12 of the fourth embodiment is the same as that of the third embodiment, i.e., as shown in FIGS. 11 and 12.

The operation of the fourth embodiment will be explained below with the aid of the flow chart shown in FIG. 25.

Figure 25:
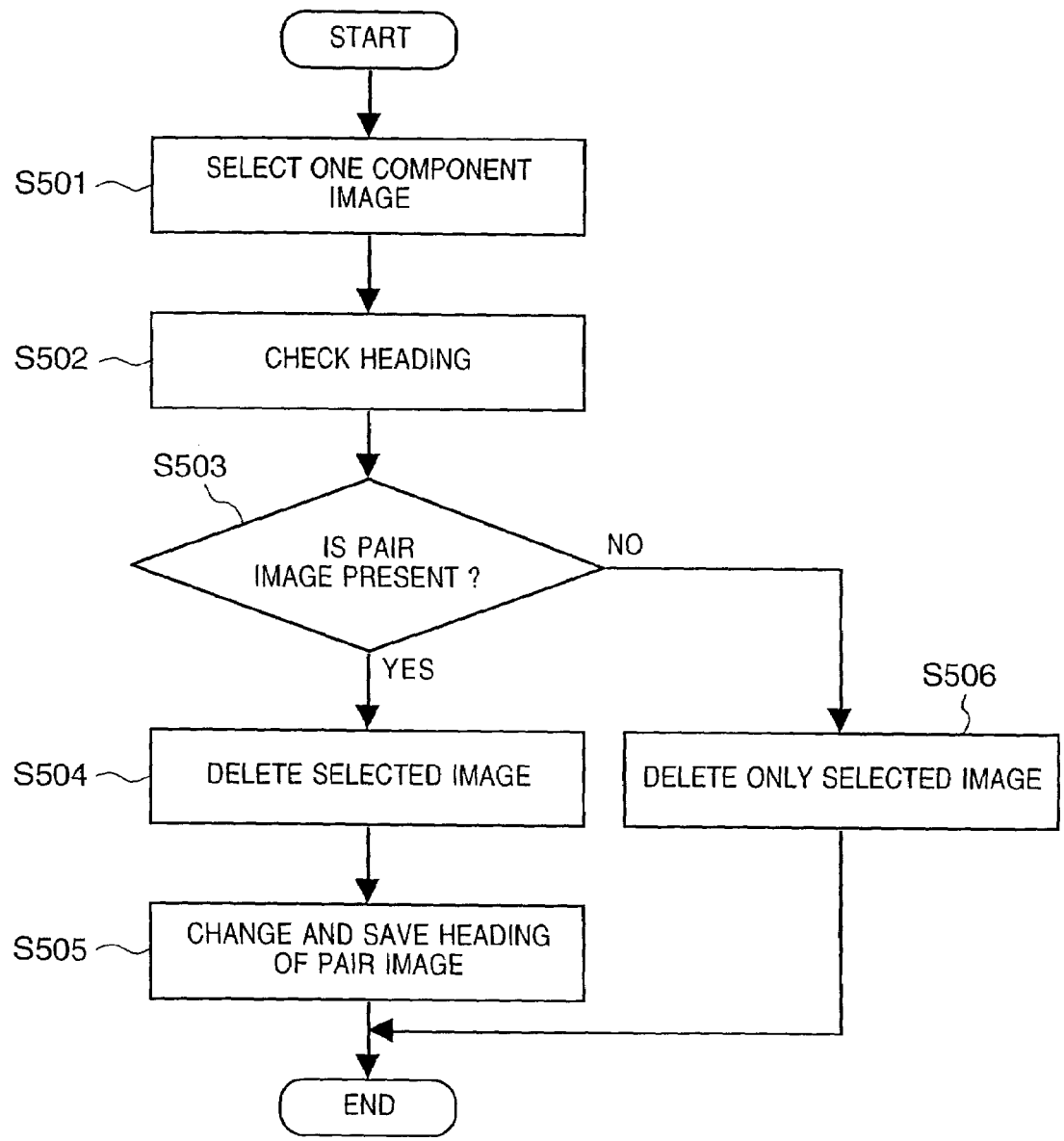
FIG. 25 is a flow chart showing deletion according to the fourth embodiment of the present invention.

The flow chart in FIG. 25 explains the operation executed upon deleting one of image files "IMAGE-R.bmp" and "IMAGE-L.bmp" that form a stereo-scopic image.

A file manager for displaying file names in a viewer software program of the fourth embodiment is started. As a result, the file names of all the files stored in the storage apparatus 12 are displayed, and the user selects a file to be deleted at the user interface 22 (step S501). For example, assume that a file "IMAGE-L.bmp" is selected as the file to be deleted.

The heading information of the selected file "IMAGE-L.bmp" is read (step S502) to check the presence/absence of a pair image (step S503). In the example shown in FIG. 11, since the value pair image file name (intra-set identifier) is "IMAGE-R.bmp", it is checked if the image file "IMAGE-R.bmp" is present in the storage apparatus 12.

If the pair image is found (step S503), the file to be deleted, i.e., the image file "IMAGE-L.bmp" selected in step S501, is deleted while displaying the pair image name "IMAGE-R.bmp" (step S504). In order to show that the selected image has been deleted, the heading information of the pair image file "IMAGE-R.bmp" is opened, and the contents in the pair image name column of "IMAGE-R.bmp" are deleted, i.e., this confirms that the pair image "IMAGE-L.bmp" of "IMAGE-R.bmp" has been deleted. Furthermore, the contents of the panoramic 3D identifier name column are also deleted. A directory which has been updated to indicate deletion of a given file is saved in the storage apparatus 12 (step S505), thus ending the control sequence.

Since the left-eye image "IMAGE-L.bmp" of a pair of images that form a stereo-scopic image has been deleted, the right-eye image file "IMAGE-R.bmp" must be processed as independent 2D image data. If the heading information of the right image file "IMAGE-R.bmp" remains unchanged, the viewer software handles the right-eye image file "IMAGE-R.bmp" as that paired with the left-eye image file "IMAGE-L.bmp", and always starts processing for stereo-scopic viewing and processing for searching the pair image file "IMAGE-L.bmp" upon reproducing the image file "IMAGE-R .bmp", thus imposing an excessive load on the apparatus. In the fourth embodiment, however, since the heading information is updated to indicate that the pair image has been deleted, the load can be eliminated.

In the control sequence in FIG. 25, if it is determined that the pair image file "IMAGE-R.bmp" is not present in the storage apparatus 12 (step S503), the left-eye image file "IMAGE-L.bmp" is deleted (step S506), thus ending the processing.

In this way, when one of a pair of image files that form a stereo-scopic image is deleted, attribute information indicating a component image of the stereo-scopic image is also deleted from the remaining image file, and that remaining image file can be handled as a normal 2D image.

In the description of the fourth embodiment, a stereo-scopic image has been exemplified. Also, basically the same processing can be done for a panoramically synthesized image obtained by synthesizing three or more images. That is, when one arbitrary image file is deleted, the remaining image file or files can be dissociated from the deleted image file by deleting information indicating an association with the deleted image from the heading information of the remaining image file or files.

The remaining component image may be searched for using the creation date of that image data.

The storage apparatus 12 may comprise a detachable apparatus such as a flash memory card.

Modification of Fourth Embodiment

Figure 26:
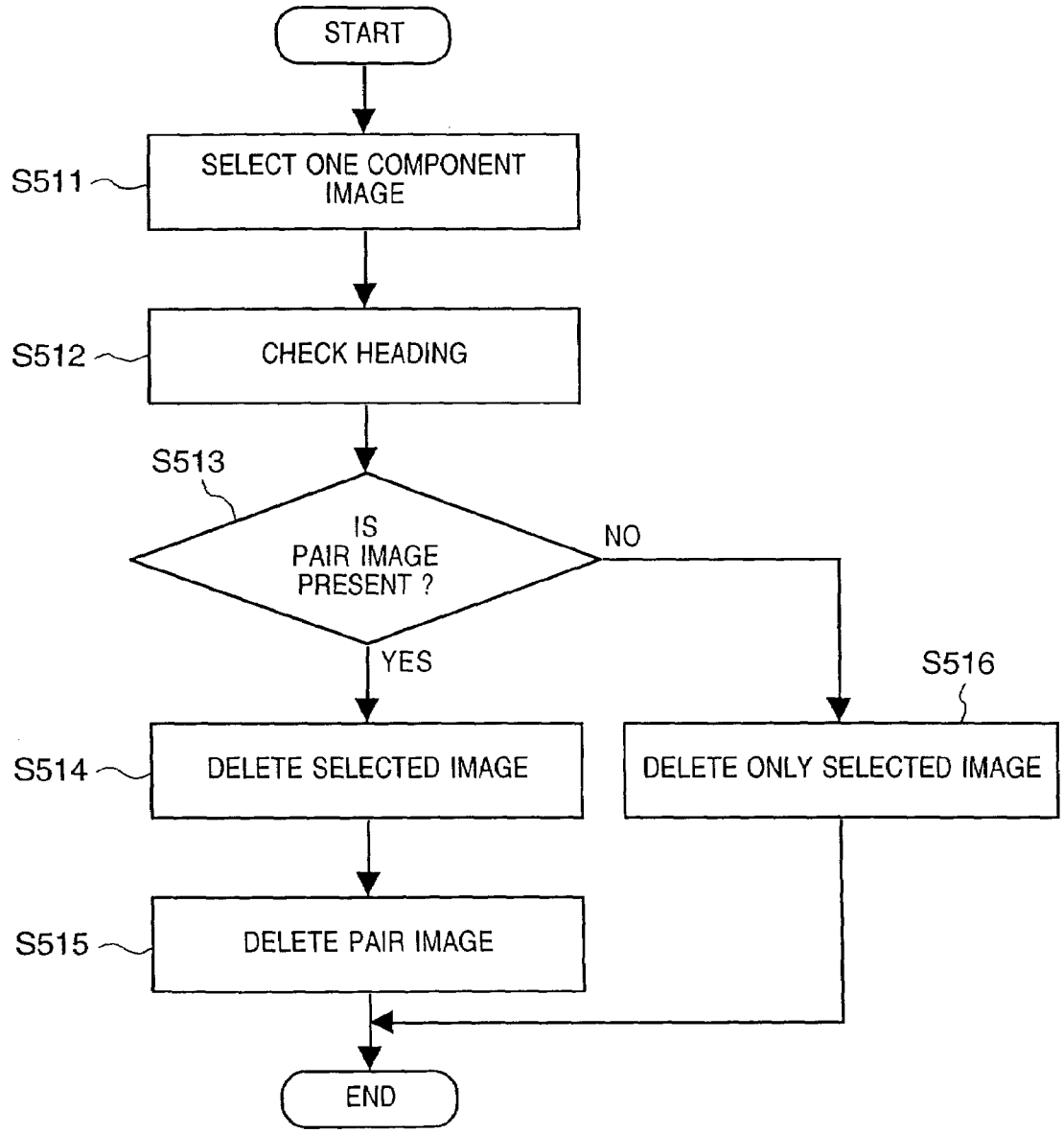
FIG. 26 is a flow chart showing the second deletion of the fourth embodiment.

The fourth embodiment may be modified to automatically delete all the remaining images upon deleting one image that forms a synthesized image. FIG. 26 is a flow chart showing that operation.

The file manager for displaying file names in the viewer software program is started. As a result, the file names of all the files stored in the storage apparatus 12 are displayed, and the user selects a file to be deleted at the user interface 22 (step S511). For example, assume that a file "IMAGE-L.bmp" is selected as the file to be deleted.

The heading information of the selected file "IMAGE-L.bmp" is read (step S512) to check the presence/absence of a pair image (step S513). If the pair image is found (step S513), the file to be deleted, i.e., the image file "IMAGE-L.bmp" selected in step S511, is deleted while displaying the pair image name "IMAGE-R.bmp" (step S514). After that, the pair image file "IMAGE-R.bmp" is also deleted (step S515), thus ending the processing.

If the pair image file "IMAGE-R.bmp" is not present in the storage apparatus 12 (step S513), only the image file "IMAGE-L.bmp" is deleted (step S516), thus ending the processing.

In this way, when at least one of a plurality of images including common attribute information is deleted, all the remaining images are deleted, thus reducing the load on the user.

Preferably, the user can arbitrary select the processing shown in FIG. 25 (i.e., when the selected image is deleted, the heading information of its pair image is updated to indicate that the selected image has been deleted), and the processing shown in FIG. 26 (both the selected image and its pair image are deleted).

Figure 27:
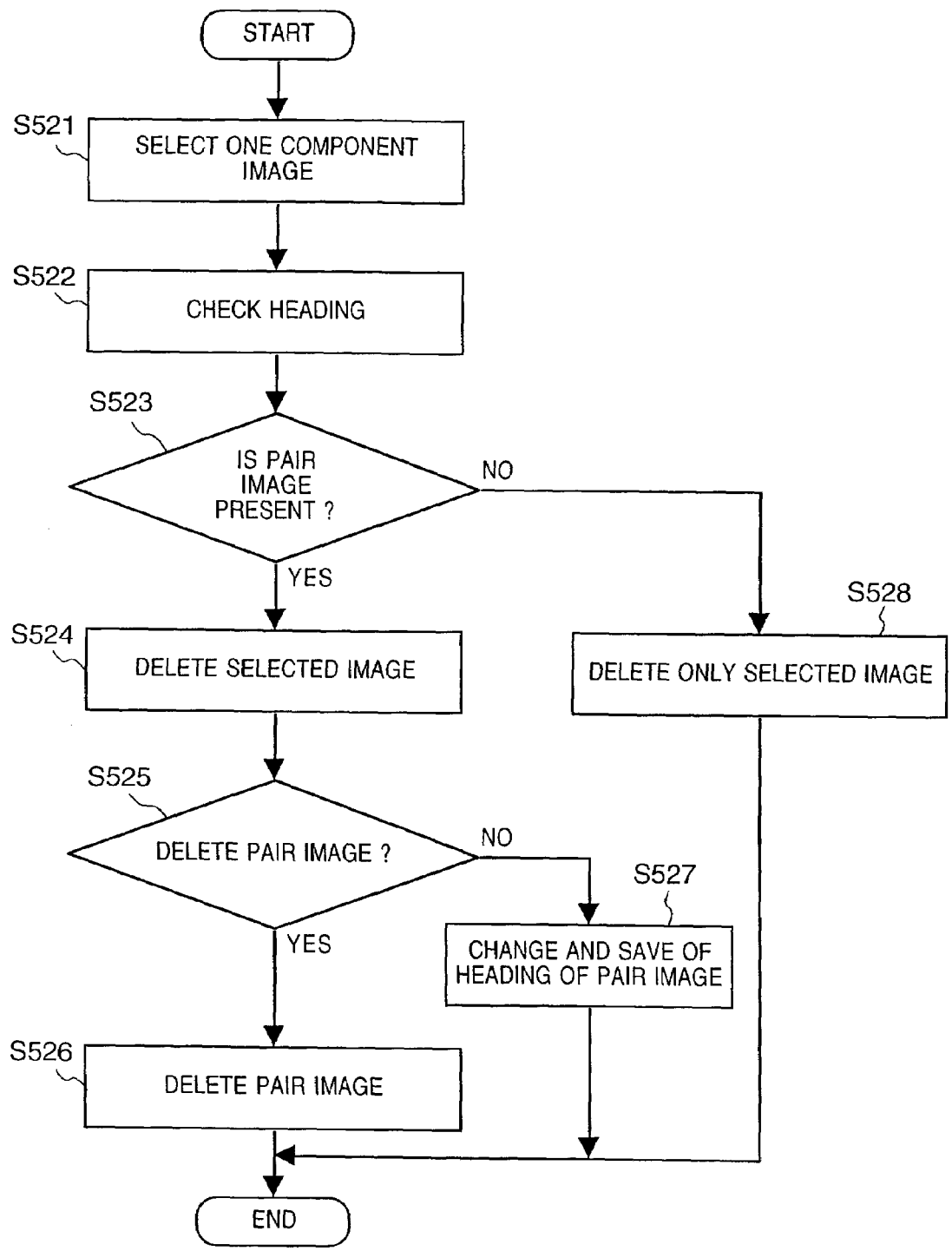
FIG. 27 is a flow chart showing the third deletion of the fourth embodiment.

FIG. 27 is a flow chart showing the operation which allows the user to select immediately before deletion whether the pair image is to be deleted or the heading information of the pair image is to be updated. Assume that as an example of images for the control sequence in FIG. 27, four image files "IMAGE1.bmp", "IMAGE2.bmp", "IMAGE3.bmp", and "IMAGE4.bmp" form a set.

When the file manager for displaying file names in the viewer software of this embodiment is started, the file names of all the files stored in the storage apparatus 12 are displayed, and the user selects a file to be deleted at the user interface 22 (step S521). For example, assume that the file "IMAGE1.bmp" is selected as the file to be deleted.

The heading information of the selected file "IMAGE-L.bmp" is read (step S522) to check based on the heading information the presence/absence of other images that form the set (step S523). In this case, "IMAGE2.bmp", "IMAGE3.bmp", and "IMAGE4.bmp" are found.

Figure 28:
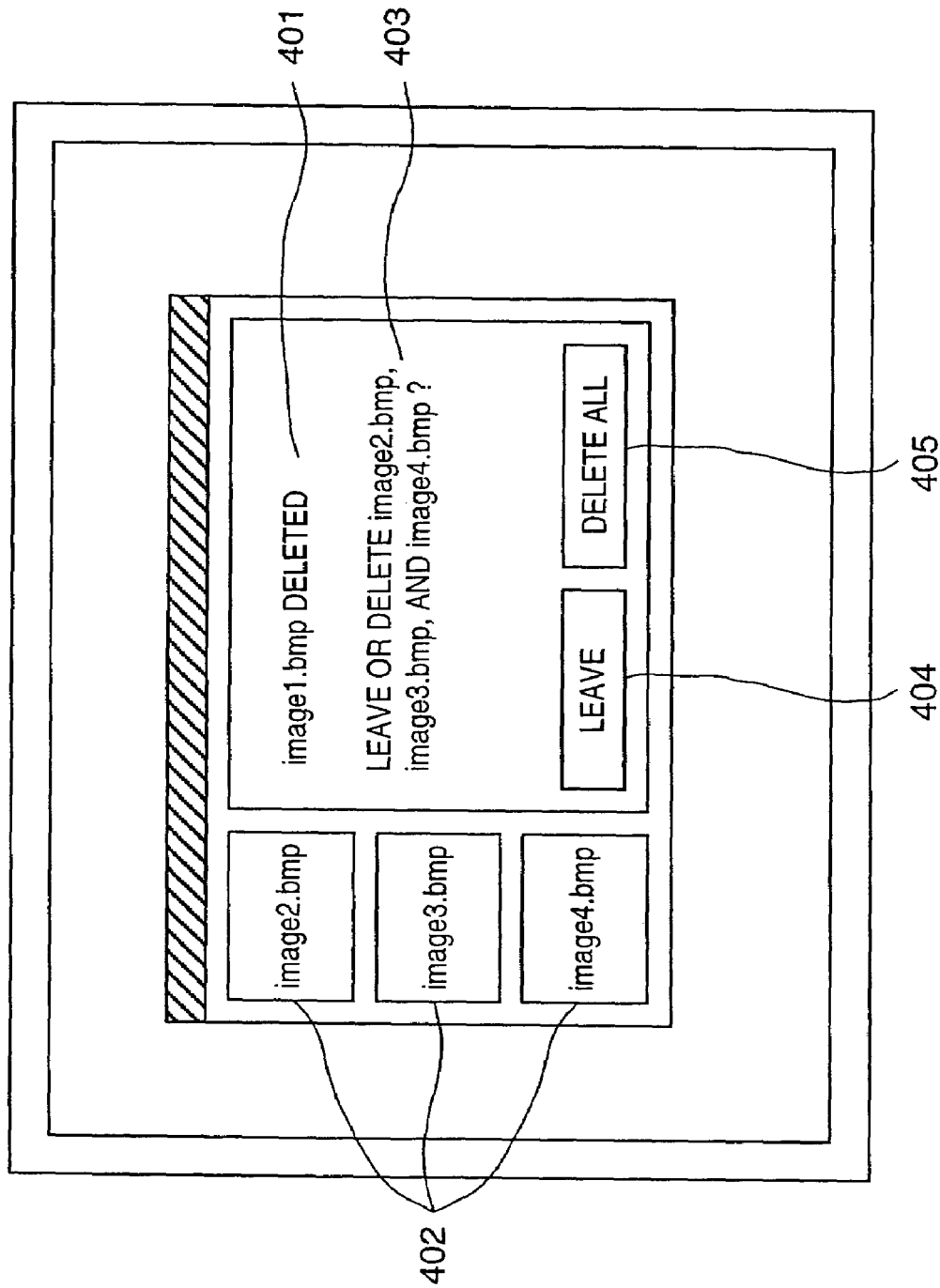
FIG. 28 shows a display screen example.

If images that belong to the identical set are found (step S523), the file "IMAGE1.bmp" to be deleted is deleted (step S524). In this case, as shown in FIG. 28, a message 401 indicating that the file "IMAGE1.bmp" to be deleted has been deleted is displayed on the screen of the monitor 28. Also, a list of image files ("IMAGE2.bmp", "IMAGE3.bmp", and "IMAGE4.bmp") that belong to the identical set is displayed on the screen of the monitor 28 (402), and a prompt message 403 for urging the user to select whether to delete or leave these "IMAGE2.bmp", "IMAGE3.bmp", and "IMAGE4.bmp" is also displayed. In response to this prompt, the user selects whether all the remaining images in the set are to be deleted (message 405) or the heading information of each of the remaining images is to be changed (message 404) (step S525).

If the user selects deletion of all the remaining images in the set, i.e., selects the icon 405 (step S525), the image files "IMAGE2.bmp", "IMAGE3.bmp", and "IMAGE4.bmp" of the set are deleted (step S526), thus ending the processing.

If the user selects "leave" (icon 404) (step S525), the contents of the pair image name column and panoramic 3D identifier name column are deleted in the heading information of the image files "IMAGE2.bmp", "IMAGE3.bmp", and "IMAGE4.bmp" in the set, and the changed heading information is saved (step S527), thus ending the processing. In the latter case, the left image files "IMAGE2.bmp", "IMAGE3.bmp", and "IMAGE4.bmp" are processed as independent images.

If no image file that belongs to the identical set is present in the storage apparatus 12 (step S523), the image file "IMAGE1.bmp" to be deleted is deleted (step S528), thus ending the processing.

In this fashion, according to the modification of the fourth embodiment, the use can select component image processing as needed.

Note that the processing for the remaining images of the set is not limited to that described with reference to FIG. 27. For example, after one arbitrary image is deleted, the remaining images may be grouped one by one or in units of an arbitrary number of images, attribute information may be changed in each group, or the image files may be deleted in units of groups.

In FIG. 27, a panoramic image has been exemplified. Also, this modification can be applied to a stereoscopic image.

In each of the above embodiments, attribute information associated with an image that forms a set is recorded in the heading field of each image file. Alternatively, another file (attribute information file) may be prepared to record detailed information associated with an image that forms a set, and the heading field of each image file may record the name of this attribute information file.

The fourth embodiment may be applied to either a system constructed by a plurality of equipments or an apparatus consisting of a single equipment.

The scope of the present invention includes a case achieved by supplying a program code of software for realizing the functions of the above embodiment to a computer in an apparatus or system connected to various devices so as to operate the various devices to implement the functions of the above embodiment, and operating the various devices in accordance with the stored program by the computer (CPU or MPU) of the apparatus or system.

In this case, the program code itself of software realizes the functions of the above-mentioned embodiment, and the program code itself, and means for supplying the program code to the computer (e.g., a storage medium which stores the program code) constitute the present invention. As the storage medium for storing the program code, for example, a floppy disk, hard disk, optical disk, magneto-optical disk, CD-ROM, magnetic tape, nonvolatile memory card, ROM, and the like may be used.

Not only when the functions of the above embodiment are implemented by executing the supplied program code by the computer but also when the functions of the above embodiment are implemented by collaboration of the program code and an OS (operating system) running on the computer, another application software, or the like, such program code is included in the embodiment of the present invention.

Furthermore, when the supplied program code is stored in a memory equipped on a function extension board of the computer or a function extension unit connected to the computer, a CPU or the like equipped on the function extension board or unit executes some or all of actual processes on the basis of the instruction of that program code, and the functions of the above embodiment are implemented by those processes, such case is also included in the present invention.

Advantages of Fourth Embodiment

As can be easily understood from the above description, according to the fourth embodiment, when one of a plurality of images having common attribute information to be subjected to predetermined processing is deleted, the remaining images are automatically deleted or the common attribute information is changed. Hence, when one of a set of images is deleted, the remaining images can be easily managed.

As many apparently widely different embodiments of the present invention can be made without departing from the spirit and scope thereof, it is to be understood that the invention is not limited to the specific embodiments thereof except as defined in the appended claims.

What is claimed is:

1. An image storage apparatus comprising:
    image-picking up means for picking up a set of n images which are associated with each other; and
    recording means for recording in a memory the set of n images picked up by said image-picking up means together with first identification information indicating that each of the images belongs to the set, second identification information includes information representing a position of the image in a synthesized image to be synthesized from the images in the set, and third identification information, different from the first identification information, for searching an image which belongs to that set; and
    searching means for searching the image belonging to a particular set among a plurality of images stored in said memory on the basis of the first or the third identification information,
    wherein both said first and second identification information are included in a file name assigned to the image.

2. The apparatus according to claim 1, wherein said image-picking up means comprises an n-eye camera.

3. The apparatus according to claim 1, wherein said image-picking up means comprises a single-eye camera, and obtains n images by picking up an object n times using said camera.

4. The apparatus according to claim 1, wherein the first identification information has a character string common to other sets and a set number for specifying the set to which the image belongs.

5. The apparatus according to claim 1, wherein the first identification information includes a creation date and time of the image.

6. The apparatus according to claim 1, wherein the second identification information includes a creation date and time of the image.

7. The apparatus according to claim 1, wherein the first identification information includes a character for identifying an objective of the image.

8. The apparatus according to claim 1, wherein the second identification information includes a character for identifying an objective of the image.

9. An image file apparatus comprising:
    recording means for recording a set of n images, which are associated with each other, together with first identification information which indicates that each of the images belongs to that set, second identification information which includes information representing a position of the image in a synthesized image to be synthesized from the images in that set, and third identification information, different from the first identification information, for searching an image which belongs to that set;
    selection means for selecting an arbitrary first image from the images recorded in said recording means;
    means for identifying a first set to which the first image belongs on the basis of the first or third identification information of the selected first image, and specifying another image which belongs to the first set on the basis of the second identification information of the first image; and
    synthesizing means for synthesizing the first image and the other image on the basis of the second identification information,
    wherein both said first and second identification information are included in a file name assigned to the image.

10. The apparatus according to claim 9, wherein said synthesizing means comprises means for visibly reproducing the synthesized image.

11. The apparatus according to claim 9, wherein the first identification information had a character string common to other sets and a set number for specifying the set to which the image belongs.

12. The apparatus according to claim 9, wherein the first identification information includes a creation date and time of the image.

13. The apparatus according to claim 9, wherein the second identification information includes a creation date and time of the image.

14. The apparatus according to claim 9, wherein the first identification information includes a character for identifying an objective of the image.

15. The apparatus according to claim 9, wherein the second identification information includes a character for identifying an objective of the image.

16. The apparatus according to claim 9, wherein said specifying means comprises:
    means for searching for a second image having the same first identification information value as the first identification information of the first image selected by said selection means; and
    means for determining whether or not the second image has second identification information of a predetermined format.

17. The apparatus according to claim 16, wherein images recorded in said recording means are appended attribute information each indicating an attribute of the image in addition to the first identification information and second identification information, and
    said specifying means further comprises:
    means for checking if the second image is present in said recording means; and
    means for searching said recording means for a third image having an attribute information value approximate to the attribute information value of the first image, when it is determined that the second image is not present.

18. The apparatus according to claim 17, wherein said specifying means further comprises:
  means for determining that the third image belongs to a set different from the set to which the first image belongs, and inhibiting the third image from being employed as an image to be synthesized, when a difference between the attribute information values of the first and third images exceeds a predetermined threshold value.

19. The apparatus according to claim 9, wherein said specifying means comprises means for displaying the first image and the other image specified by said specifying means for user's confirmation, when the other image which belongs to the first set is specified.

20. The apparatus according to claim 9, wherein said synthesizing means synthesizes the first image and the specified other image for a panoramic synthesis objective.

21. The apparatus according to claim 9, wherein said synthesizing means synthesizes the first image and the specified other image for a stereo-scoping viewing objection.

22. An image recording method comprising the steps of:
  picking up a set of n images which are associated with each other; and
  recording in a memory the set of n images picked up in the image-picking up step together with first identification information indicating that each of the images belongs to the set, second identification information includes information representing a position of the image in a synthesized image to be synthesized from the images in the set, and third identification information, different from the first identification information, for searching an image which belongs to that set; and
  searching the image belonging to a particular set among a plurality of images stored in said memory on the basis of the first or the third identification information, wherein both said first and second identification information are included in a file name assigned to the image.

23. The method according to claim 22, wherein the image-picking up step includes the step of obtaining n images at the same time using an n-eye camera.

24. The method according to claim 22, wherein the image-picking up step includes the step of obtaining n images by picking up an object n times using a single-eye camera.

25. The method according to claim 22, wherein the first identification information has a character string common to other sets and a set number for specifying the set to which the image belongs.

26. The method according to claim 22, wherein the first identification information includes a creation date and time of the image.

27. The method according to claim 22, wherein the second identification information includes a creation date and time of the image.

28. The method according to claim 22, wherein the first identification information includes a character for identifying an objective of the image.

29. The method according to claim 22, wherein the second identification information includes a character for identifying an objective of the image.

30. An image processing method comprising the steps of:
  recording in a memory a set of n images, which are associated with each other, together with first identification information which indicates that each of the images belongs to that set, second identification information which includes information representing a position of the image in a synthesized image to be synthesized from the images in that set, and third identification information, different from the first identification information, for searching an image which belongs to that set;
  allowing a user to select an arbitrary first image from the images recorded in said memory;
  identifying a first set to which the first image belongs on the basis of the first or third identification information of the selected first image, and specifying another image which belongs to the first set on the basis of the second identification information of the first image; and
  synthesizing the first image and the other image on the basis of the second identification information,
  wherein both said first and second identification information are included in a file name assigned to the image.

31. The method according to claim 30, wherein the synthesizing step includes the step of visibly reproducing the synthesized image.

32. The method according to claim 30, wherein the first identification information has a character string common to other sets and a set number for specifying the set to which the image belongs.

33. The method according to claim 30, wherein the first identification information includes a creation date and time of the image.

34. The method according to claim 30, wherein the second identification information includes a creation date and time of the image.

35. The method according to claim 30, wherein the first identification information includes a character for identifying an objective of the image.

36. The method according to claim 30, wherein the second identification information includes a character for identifying an objective of the image.

37. The method according to claim 30, wherein the specifying step further comprises the steps of:
  searching for a second image having the same first identification information value as the first identification information of the first image selected in the allowing step; and
  determining whether or not the second image has second identification information of a predetermined format.

38. The method according to claim 37, wherein images recorded in said memory are appended attribute information each indicating an attribute of the image in addition to the first identification information and second identification information, and
  the specifying step further comprises the steps of:
  checking if the second image is present in said memory; and
  searching said memory for a third image having an attribute information value of the first image, when it is determined that the second image is not present.

39. The method according to claim 38, wherein the specifying step further comprises the step of:
  determining that the third image belongs to a set different from the set to which the first image belongs, and inhibiting the third image from being employed as an image to be synthesized, when a difference between the attribute information values of the first and third images exceeds a predetermined threshold value.

40. The method according to claim 30, wherein the specifying step includes the step of displaying the first image and the other image specified in the specifying step for user's confirmation, when the other image which belongs to the first set is specified.

41. The method according to claim 30, wherein the synthesizing step includes the step of synthesizing the first image and the specified other image for a panoramic synthesis objective.

42. The method according to claim 30, wherein the synthesizing step includes the step of synthesizing the first image and the specified other image for a stereo-scoping viewing objective.

43. A computer readable program recording medium comprising:
   a program code of picking up a set of n images which are associated with each other;
   a program code of recording in a memory the set of n images picked up in the image-picking up step together with first identification information indicating that each of the images belongs to the set, second identification information including information representing a position of the image in a synthesized image to be synthesized from the images in the set, and third identification information, different from the first identification information, for searching an image which belongs to that set; and
   a program code of searching the image belonging to a particular set among a plurality of images stored in said memory,
   wherein both said first and second identification information are included in a file name assigned to the image.

44. A computer-readable program recording medium comprising:
   a program code of recording in a memory a set of n images, which are associated with each other, together with first identification information which indicates that each of the images belongs to that set, second identification information which includes information representing a position of the image in a synthesized image to be synthesized from the images in that set, and third identification information, different from the first identification information, for searching an image which belongs to that set; and
   a program code of allowing a user to select an arbitrary first image from the images recorded in said memory;
   a program code of identifying a first set to which the first image belongs on the basis of the first or third identification information of the selected first image, and specifying another image which belongs to the first set on the basis of the second identification information of the first image; and
   a program code of synthesizing the first image and the other image on the basis of the second identification information,
   wherein both said first and second identification information are included in a file name assigned to the image.

45. The apparatus according to claim 1, wherein the third identification information includes a creation date and time of the image.

46. The apparatus according to claim 9, wherein the third identification information includes a creation date and time of the image.

47. The method according to claim 22, wherein the third identification information includes a creation date and time of the image.

48. The method according to claim 30, wherein the third identification information includes a creation date and time of the image.

49. The apparatus according to claim 1, wherein the second identification information includes a character for identifying an objective of the image.

50. The apparatus according to claim 9, wherein the third identification information includes a character for identifying an objective of the image.

51. The method according to claim 22, wherein the third identification information includes a character for identifying an objective of the image.

52. The method according to claim 30, wherein the third identification information includes a character for identifying an objective of the image.

* * * * *